(12) United States Patent
Ishikawa et al.

(10) Patent No.: US 8,278,009 B2
(45) Date of Patent: Oct. 2, 2012

(54) METALLIC MATERIAL FOR CONDUCTIVE MEMBER, SEPARATOR FOR FUEL CELL USING THE SAME, AND FUEL CELL USING THE SEPARATOR

(75) Inventors: Shin Ishikawa, Chiba (JP); Yasushi Kato, Chiba (JP); Osamu Furukimi, Chiba (JP)

(73) Assignee: JFE Steel Corporation (JP)

( * ) Notice: Subject to any disclaimer, the term of this patent is extended or adjusted under 35 U.S.C. 154(b) by 826 days.

(21) Appl. No.: 10/592,857

(22) PCT Filed: Mar. 17, 2005

(86) PCT No.: PCT/JP2005/005463
§ 371 (c)(1),
(2), (4) Date: Sep. 14, 2006

(87) PCT Pub. No.: WO2005/090626
PCT Pub. Date: Sep. 29, 2005

(65) Prior Publication Data
US 2008/0233456 A1  Sep. 25, 2008

(30) Foreign Application Priority Data
Mar. 18, 2004  (JP) .................................. 2004-078717
Mar. 18, 2004  (JP) .................................. 2004-078718

(51) Int. Cl.
*H01M 4/64* (2006.01)
*H01M 8/04* (2006.01)
*H01M 8/24* (2006.01)

(52) U.S. Cl. ......... 429/518; 429/457; 429/514; 429/522

(58) Field of Classification Search ..................... 429/12, 429/30, 32, 34, 129, 132–133, 457, 514, 429/518–520, 522, 535; 72/379.2; 252/518.1, 252/519.12, 520.2, 520.21, 520.4, 521.2
See application file for complete search history.

(56) References Cited

U.S. PATENT DOCUMENTS 3,010,854 A  11/1961  Satterfield
2002/0160248 A1*  10/2002  Takao et al. ..................... 429/30

FOREIGN PATENT DOCUMENTS

| | | |
|---|---|---|
| EP | 1 046 723 A1 | 10/2000 |
| EP | 1 235 290 A2 | 8/2002 |
| JP | 04-358044 A | 12/1992 |
| JP | 11-197704 A | 7/1999 |
| JP | 11-244907 A | 9/1999 |
| JP | 2000-239806 A | 9/2000 |
| JP | 2003-234109 A | 8/2003 |
| JP | 2003-317735 A | 11/2003 |

* cited by examiner

*Primary Examiner* — Barbara Gilliam
*Assistant Examiner* — Claire L Roe
(74) *Attorney, Agent, or Firm* — DLA Piper LLP (US)

(57) ABSTRACT

A metallic material for a conductive member has good corrosion resistance and low contact resistance. The metallic material has 0.3 μm or less of mean spacing of local peaks of the surface roughness profile. A proton-exchange membrane fuel cell includes a proton-exchange membrane, an electrode, a gas diffusing layer, and a separator using the metallic material for a conductive member, where the metallic material for a conductive member includes a stainless steel and includes 0.03% or less C, 0.03% or less N, 16 to 45% Cr, 0.1 to 5.0% Mo, 0.03% or less (C+N), by mass, and balance of Fe and inevitable impurities, and where the metallic material for a conductive member has 0.3 μm or less of mean spacing of local peaks of the surface roughness profile.

12 Claims, 5 Drawing Sheets

METALLIC MATERIAL FOR CONDUCTIVE MEMBER, SEPARATOR FOR FUEL CELL USING THE SAME, AND FUEL CELL USING THE SEPARATOR

This application is the United States national phase application of International Application PCT/JP2005/005463 filed Mar. 17, 2005.

TECHNICAL FIELD

This disclosure relates to: a metallic material for conductive member having excellent corrosion resistance and small contact resistance, specifically to a metallic material such as stainless steel, titanium (industrial pure titanium, hereinafter referred to as "titanium"), and titanium alloy, which has a property to easily form a passive film thereon; a separator for a proton-exchange membrane fuel cell using thereof; and a proton-exchange membrane fuel cell using the separator.

BACKGROUND ART

In view of conservation of global environment, development of fuel cells which have excellent power generation efficiency without emitting $CO_2$ has been promoted in recent years. This type of fuel cells generates electricity by an electrochemical reaction between $H_2$ and $O_2$. The basic structure of the fuel cell is an electrolyte membrane (in other words an ion exchange membrane), two electrodes (in other words a fuel electrode and an air electrode), diffusion layers for $O_2$ (or air) and $H_2$, respectively, and two separators. Depending on the kind of electrolyte membrane, there have been developed phosphoric-acid fuel cells, molten carbonate fuel cells, solid-oxide fuel cells, alkaline fuel cells, proton-exchange membrane fuel cells, and the like.

As of these fuel cells, the proton-exchange membrane fuel cells have advantages including the ones given below compared with other types of fuel cells:

(a) The power generating temperature is about 80° C., allowing generating electricity at a significantly low temperature level;

(b) Design of reduced weight and size of the fuel cell body is available; and (c) Start up within a short time is achieved.

Owing to these advantages, the proton-exchange membrane fuel cells currently draw keenest attention among various types of fuel cells as a power source of electric vehicles, a stationary power generator for household or commercial services, and a portable miniature power generator.

The proton-exchange membrane fuel cell generates electricity from $H_2$ and $O_2$ via a polymer membrane. As illustrated in FIG. 1, the proton-exchange membrane fuel cell has a structure of sandwiching a membrane-electrode assembly 1 between gas diffusing layers 2 and 3 (carbon paper and the like) and further between separators 4 and 5, thus forming a single structure unit (what is called a single cell), thereby generating electromotive force between the separator 4 and the separator 5.

The membrane-electrode assembly 1 is called "MEA", which has an integrated structure of a polymer membrane being sandwiched between the respective electrode materials such as carbon black sheets supporting a platinum-based catalyst, giving total thicknesses from several tens of micrometers to several hundreds of micrometers. The gas diffusing layers 2 and 3 are often integrated with the MEA 1.

When the proton-exchange membrane fuel cell is used for above-applications, those single cells are combined in series by the quantities from several tens to several hundreds to form a fuel cell stack.

The separators 4 and 5 are required to have functions of:

(A) Separation wall between single cells;

(B) Electric conductor to transfer the generated electrons;

(C) Air flow channel and hydrogen flow channel through which $O_2$ (in other words air) and $H_2$ flow, respectively; and (D) Discharge flow channels for discharging the generated water and gas, respectively.

Furthermore, practical applications of the proton-exchange membrane fuel cells require to use the separators 4 and 5 which have high durability and electric conductivity.

For the case that the proton-exchange membrane fuel cells are used as the power source of electric vehicles, the expecting durability is about 5000 hours of service life. For the case of utilizing them as the household stationary power generator or the like, the expecting durability is about 40000 hours of service life. Accordingly, the separators 4 and 5 are requested to have corrosion resistance enduring the long period of power generation service because once the corrosion occurred to elute metallic ions, the proton conductivity of the electrolyte membrane decreases.

Regarding the electric conductivity, the separators 4 and 5 and the gas diffusion layers 2 and 3 are wanted to have low contact resistance as far as possible because the increase in the contact resistance of the separators 4 and 5 and the gas diffusion layers 2 and 3 decreases the power generation efficiency of the proton-exchange membrane fuel cell. That is, smaller contact resistance of the separator and the diffusion layer gives superior power generation characteristics.

Currently a proton-exchange-membrane fuel cell utilizing graphite as the separators 4 and 5 has been brought into practical application. The separators 4 and 5 made of graphite have advantages of relatively low contact resistance and of non-corrosiveness. Since, however, they are readily broken under impaction, they have drawbacks of difficulty in scale down and expensive working cost for forming the air flow channel 6 and the hydrogen flow channel 7. Those drawbacks of the separators 4 and 5 made of graphite hinder the wide utilization of the proton-exchange membrane fuel cells.

There are trials to adopt metallic base material as the base material of separators 4 and 5, instead of the graphite. Particularly in view of improvement of durability, various studies are given to the practical use of separators 4 and 5 made by stainless steel, titanium, titanium alloy, and the like as the base material.

For example, JP-A-8-180883, (the term "JP-A" referred to herein signifies the "Unexamined Japanese Patent Publication"), discloses a technology of using a metal such as stainless steel and titanium alloy, which easily forms a passive film thereon, as the separator. The formation of passive film, however, induces increase in the contact resistance, which results in decrease in the power generation efficiency. Therefore, those metallic base materials have various issues such as larger contact resistance than that of graphite base material and inferiority in corrosion resistance.

JP-A-10-228914 discloses a technology to decrease the contact resistance and to assure high output power by applying gold plating on the surface of the metallic separator made of austenitic stainless steel (SUS304 in other words type 304) or the like. The thin gold plating, however, is difficult to prevent pinhole generation, while thick gold plating arises a cost problem.

JP-A-2000-277133 discloses a method to form a separator having improved electric conductivity (or decreased contact resistance) by dispersing carbon powder particles in the matrix of ferritic stainless steel. Since, however, the surface treatment of the separator needs a cost even with the use of carbon powder, there still remains the cost problem. In addition, the separator after surface treatment has a problem of significant decrease in the corrosion resistance once flaws or other defects appear during assembly stage.

There are trials of using stainless steel as the separator without applying surface treatment. For example, JP-A-2000-239806 and JP-A-2000-294255 disclose ferritic stainless steels for the separator, adding positively Cu and Ni, and decreasing impurities such as S, P, and N, while satisfying [(C+N)≦0.03% by mass], and [10.5% by mass≦(Cr+3×Mo)≦43% by mass]. JP-A-2000-265248 and JP-A-2000-294256 disclose ferritic stainless steels for the separator, limiting Cu and Ni to 0.2% by mass or less to suppress elution of metallic ions, decreasing impurities such as S, P, and N, while satisfying [(C+N)≦0.03% by mass], and [10.5% by mass≦(Cr+3×Mo)≦43% by mass].

Those inventions, however, are based on a concept that the ingredients of stainless steel are limited to a specific range to strengthen the passive film, thereby suppressing the deterioration of performance of the catalyst supported on the electrode caused by the eluted metallic ions even without applying surface treatment, and suppressing the increase in the resistance of contact with electrode caused by the corrosion products. Accordingly, these inventions do not intend to decrease the contact resistance of the stainless steel itself. Furthermore, they cannot secure the durability to prevent the reduction in the output voltage during service period of several tens of thousands of hours.

There are also studies of the effect of surface roughness of a separator on the contact resistance. For example, JP-A-2002-270196 discloses a proton-exchange membrane fuel cell which uses a separator made of a stainless steel having surface irregularities, and which stainless steel is covered by a Cr-enriched passive film on the surface thereof. According to the disclosure, a preferred range of the surface roughness parameter is from 0.03 to 2 μm of centerline average surface roughness Ra, in other words arithmetic average surface roughness. According to our finding, however, even stainless steels having equivalent Ra with each other give significantly different contact resistance from each other so that sole maintaining Ra in a specific range is difficult to significantly decrease the contact resistance.

Responding to the above problems of the related art, it could therefore be helpful to provide: a metallic material for conductive member, which gives good corrosion resistance and small contact resistance (in other words high electric conductivity), specifically a metallic material for conductive member, such as stainless steel, titanium, and titanium alloy to easily form a passive film thereon, in particular a metallic material for a separator in a proton-exchange membrane fuel cell; a separator using thereof; and a proton-exchange membrane fuel cell using the separator.

That is, it could be helpful to provide: a metallic material for a separator in a proton-exchange membrane fuel cell, which gives small contact resistance, high power generation efficiency, and high corrosion resistance of the metallic material itself, without applying surface treatment such as gold plating, by specifying not only the components of the metallic material having a property to easily form a passive film thereon but also, among various surface roughness parameters, the surface roughness parameter significantly affecting the contact resistance with the gas diffusion layer to a specific range; a separator using the metallic material; and a proton-exchange membrane fuel cell using the separator.

SUMMARY

We thus provide the following.

1. A metallic material for conductive member, the metallic material having a property to easily form a passive film thereon, and having 0.3 μm or less of mean spacing of local peaks of the surface roughness profile.

2. The metallic material for conductive member according to 1, wherein the metallic material has 0.05 or more of root mean square slope of the surface roughness profile.

3. The metallic material for conductive member according to 1 or 2, wherein the metallic material is a ferritic stainless steel composed of 16 to 45% Cr, 0.03% or less C, 0.03% or less N, 0.03% or less (C+N), 0.1 to 5.0% Mo, by mass, and balance of Fe and inevitable impurities.

4. The metallic material for conductive member according to 3, wherein the ferritic stainless steel is composed of, adding to the aforementioned ingredients, at least one element selected from the group consisting of (1) to (4): (1) 1.0% or less Si, (2) 1.0% or less Mn, (3) 3.0% or less Cu, and (4) 0.01 to 0.5% of sum of at least one of Ti, Nb, V, and Zr, by mass.

5. The metallic material for conductive member according to 1 or 2, wherein the metallic material is an austenitic stainless steel composed of 0.03% or less C, 16 to 30% Cr, 0.1 to 10.0% Mo, 7 to 40% Ni, by mass, and balance of Fe and inevitable impurities.

6. The metallic material for conductive member according to 5, wherein the austenitic stainless steel is composed of, adding to the aforementioned ingredients, at least one element selected from the group consisting of (1) to (5): (1) 2.0% or less N, (2) 3.0% or less Cu, (3) 1.5% or less Si, (4) 2.5% or less Mn, and (5) 0.01 to 0.5% of sum of at least one of Ti, Nb, V, and Zr, by mass.

7. The metallic material for conductive member according to 1 or 2, wherein the metallic material is a titanium or a titanium alloy, each containing 70% or more Ti, by mass.

8. A separator for a proton-exchange membrane fuel cell, using the metallic material for conductive member according to any of 1 to 7.

9. A proton-exchange membrane fuel cell composed of a proton-exchange membrane, an electrode, a gas diffusing layer, and a separator, wherein the separator is the one according to 8.

10. A stainless steel for separator in a proton-exchange membrane fuel cell, being composed of 0.03% or less C, 0.03% or less N, 16 to 45% Cr, 0.1 to 5.0% Mo, 0.03% or less (C+N), by mass, and balance of Fe and inevitable impurities, and having 0.3 μm or less of mean spacing of local peaks of the surface roughness profile.

11. The stainless steel for separator in a proton-exchange membrane fuel cell according to 10, being composed of, adding to the aforementioned ingredients, at least one element selected from the group consisting of (1) to (4): (1) 1.0% or less Si, (2) 1.0% or less Mn, (3) 3.0% or less Cu, and (4) 0.01 to 0.5% of sum of at least one of Ti, Nb, V, and Zr, by mass.

12. A separator for a proton-exchange membrane fuel cell, being made of stainless steel composed of 0.03% or less C, 0.03% or less N, 16 to 45% Cr, 0.1 to 5.0% Mo, 0.03% or less (C+N), by mass, and balance of Fe and inevitable impurities, and having 0.3 μm or less of mean spacing of local peaks of the surface roughness profile.

13. The separator for a proton-exchange membrane fuel cell according to 12, wherein the stainless steel is composed of, adding to the aforementioned ingredients, at least one element selected from the group consisting of (1) to (4): (1)

1.0% or less Si, (2) 1.0% or less Mn, (3) 3.0% or less Cu, and (4) 0.01 to 0.5% of sum of at least one of Ti, Nb, V, and Zr, by mass.

14. A proton-exchange membrane fuel cell composed of a proton-exchange membrane, an electrode, and a separator, wherein the separator is the separator for a proton-exchange membrane fuel cell according to 12 or 13.

15. A stainless steel for separator in a proton-exchange membrane fuel cell, being composed of 0.03% or less C, 16 to 30% Cr, 0.1 to 10.0% Mo, 7 to 40% Ni, by mass, and balance of Fe and inevitable impurities, and having 0.3 μm or less of mean spacing of local peaks of the surface roughness profile.

16. The stainless steel for separator in a proton-exchange membrane fuel cell according to 15, being composed of, adding to the aforementioned ingredients, at least one element selected from the group consisting of (1) to (5): (1) 2.0% or less N, (2) 3.0% or less Cu, (3) 1.5% or less Si, (4) 2.5% or less Mn, and (5) 0.01 to 0.5% of sum of at least one of Ti, Nb, V, and Zr, by mass.

17. A separator for a proton-exchange membrane fuel cell, being made of stainless steel composed of 0.03% or less C, 16 to 30% Cr, 0.1 to 10.0% Mo, 7 to 40% Ni, by mass, and balance of Fe and impurities, and having 0.3 μm or less of mean spacing of local peaks of the surface roughness profile.

18. The separator for a proton-exchange membrane fuel cell according to 17, wherein the stainless steel is composed of, adding to the aforementioned ingredients, at least one element selected from the group consisting of (1) to (5): (1) 2.0% or less N, (2) 3.0% or less Cu, (3) 1.5% or less Si, (4) 2.5% or less Mn, and (5) 0.01 to 0.5% of sum of at least one of Ti, Nb, V, and Zr, by mass.

19. A proton-exchange membrane fuel cell composed of a proton-exchange membrane, an electrode, and a separator, wherein the separator is the separator for a proton-exchange membrane fuel cell according to 17 or 18.

DESCRIPTION OF THE SYMBOLS

Figure 1:
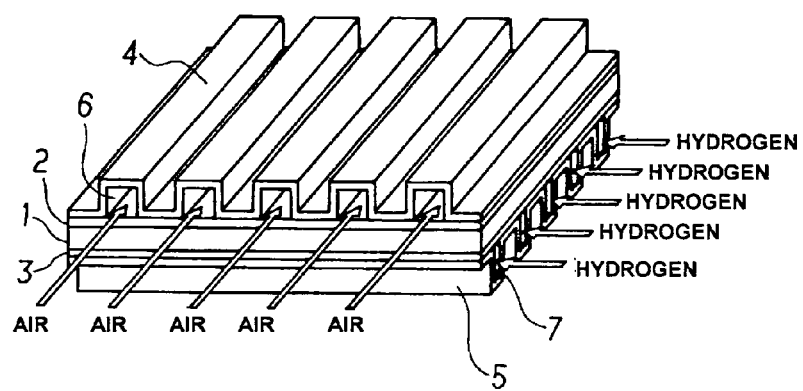
FIG. 1 is a perspective view illustrating an example of single cell of proton-exchange membrane fuel cell.

1: Membrane-electrode assembly (MEA)
2: Gas diffusion layer
3: Gas diffusion layer
4: Separator
5: Separator
6: Air flow channel
7: Hydrogen flow channel
8: Specimen
9: Carbon paper
10: Electrode
11: SEM measuring position
12: Metallic material
13: Local peak
14: Peak discriminated by a contact stylus roughness meter

DETAILED DESCRIPTION

Regarding the separator made of a metallic material to perform high corrosion resistance while keeping the contact resistance to a low level, we conducted detailed studies of stainless steel, titanium, and titanium alloy, which easily form a passive film thereon, in terms of components and surface roughness, and found that the contact resistance between the metallic material and the gas diffusion layer can be significantly decreased by decreasing the spacing of fine surface irregularities of submicron order, (mean spacing of local peaks), not controlling the irregularities at a pitch determined by a contact stylus roughness meter or the like, (for example, arithmetic average surface roughness Ra). Furthermore, we found that the increase in the root mean square slope of the surface roughness profile determined by the contact stylus roughness meter is also effective.

Figure 3:
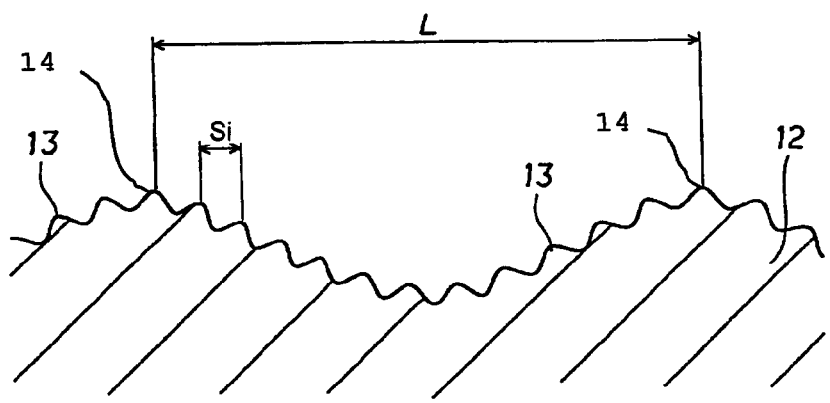
FIG. 3 is a cross sectional view illustrating the surface roughness profile of a metallic material after adjusting the surface roughness.

The term "local peaks" referred to herein is defined in Japanese Industrial Standards (JIS) B0601-1994. As illustrated in FIG. 3, when a metallic material is cut in the vertical direction to the plane thereof, the local peaks 13 appear as the peaks of local irregularities on the surface roughness profile, (the maximum peak height among the local peaks between adjacent minimal points), found after removing the long-wavelength component from the cross sectional profile. The mean spacing S of local peaks 13 is the average value of a plurality of spacing Si between adjacent local peaks, as defined in JIS B0601-1994, (refer to the formula (1)).

$$S = \frac{1}{n}\sum_{i=1}^{n} Si \quad (1)$$

The observed value of spacing Si of local peaks 13 differs with the applied measuring method. According to a contact stylus roughness meter which is commonly used as defined in JIS B0601-1994, the radius of stylus tip is 2 μm so that the instrument determines the spacing on relatively rough irregularities, or micron order or larger. For example, on the cross section shown in FIG. 3, the spacing of local peaks determined by the contact stylus roughness meter is L. However, the portion between adjacent peaks 14, (in other words the portion with the spacing L), which can be discriminated by the contact stylus roughness meter is not flat in more microscopic scale but containing very fine irregularities. In this case, if a measuring method having higher resolution than that of the contact stylus roughness meter is available, the observed value of spacing Si of local peaks 13 becomes smaller than the spacing L of local peaks 14 determined by the contact stylus roughness meter.

We found that the reduction in contact resistance is enhanced by adjusting the spacing of very fine irregularities smaller than the spacing L of local peaks 14 determined by the contact stylus roughness meter. Accordingly, it is necessary to adopt a measuring method that has a resolution necessary to determine the spacing Si of the local peaks 13. Although an atomic force microscope or the like can determine the irregularities at atomic level, the spacing of extremely fine irregularities does not affect the contact resistance. Consequently, determination of the spacing Si of local peaks 13 needs to eliminate the detection of the atomic level irregularities.

That is, the spacing Si of local peaks 13 is the value observed by a method which had 0.1 µm or smaller resolution in the horizontal direction (or lateral direction to the roughness profile) and has 0.1 µm or smaller resolution in the vertical direction (or height direction to the roughness profile), thereby not-detecting the wavelength component of smaller than 0.02 µm on the roughness profile, or the value observed after eliminating smaller than 0.02 µm of wavelength component using a filter. The measurement may be done by an analytical method using, for example, backscattering electron images of scanning electron microscope.

Figure 6:
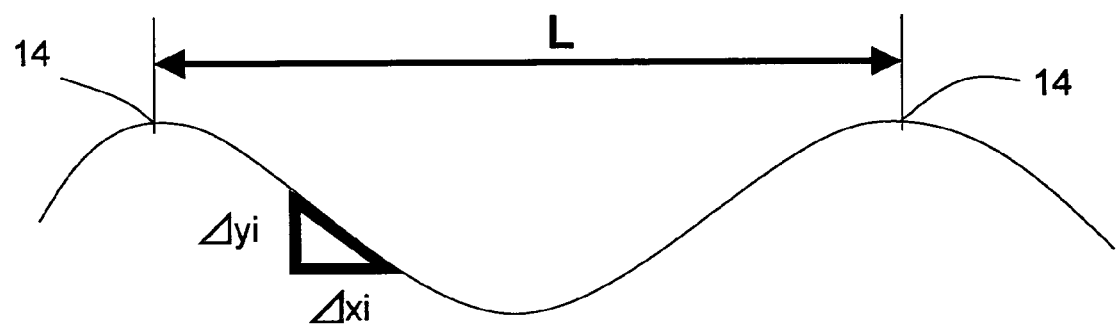
FIG. 6 illustrates the root mean square slope of the surface roughness profile, Δq.

The root mean square slope of the surface roughness profile $\Delta q$ is defined in JIS B0660-1998. As illustrated in FIG. 6, $\Delta q$ is the value of root mean square of the rate of change $\Delta yi/\Delta xi$, (slope, slope of tangent), at each point on the roughness profile determined by the contact stylus roughness meter, (refer to the formula (2)).

$$\Delta q = \sqrt{1/n \sum_{i=1}^{n} (\Delta yi/\Delta xi)^2} \quad (2)$$

The root mean square slope of the surface roughness profile $\Delta q$ depends on both the height in the longitudinal direction of the roughness profile and the spacing of irregularities in the lateral direction thereof. That is, with the same arithmetic average surface roughness Ra, longer spacing L of peaks in the lateral direction gives smaller $\Delta q$, while shorter spacing L of peaks therein gives larger $\Delta q$. When the metallic material is rolled or polished, the value of $\Delta q$ differs with the measuring direction, giving the maximum value under the measurement in the direction orthogonal to the rolling or polishing direction.

We found that the irregularities between relatively large peaks, larger than micron order, also affects the contact resistance to a certain degree, adding to the above-described effect of spacing S of fine local peaks of submicron order. However, not the arithmetic average surface roughness Ra, but rather the root mean square slope of the surface roughness profile $\Delta q$ directly affects the contact resistance. Furthermore, if the metallic material is rolled or polished, the value of $\Delta q$ differs with the measuring direction, and the effect appears if only the value $\Delta q$ of is large in the direction orthogonal to the rolling or polishing direction.

The determination of $\Delta q$ value may be given under the condition specified in JIS B0601-1994, using a contact stylus roughness meter. When the metallic material is rolled or polished, the measurement is done in the direction orthogonal to the rolling or polishing direction.

Following is the description about our experimental results.

The experiments applied base materials of: a ferritic stainless steel sheet (0.5 mm in thickness) containing 0.004% C, 0.007% N, 0.1% Si, 0.1% Mn, 30.5% Cr, 1.85% Mo, 0.03% P, 0.005% S, by mass, prepared by cold-rolling followed by annealing (at 950° C. for 2 minutes) in air; a commercially available austenitic stainless steel SUS316L sheet (0.5 mm in thickness); and an industrial pure titanium sheet (99% of purity, 2 mm in thickness).

The ferritic stainless steel sheet was polished in a wet state using #180 to 600 emery papers and using buff (mirror finish). The austenitic stainless steel sheet and the industrial pure titanium sheet were polished in wet state using #180 to 600 emery papers. Those base materials were further immersed in an acidic aqueous solution to adjust their surface roughness, and were then cleaned by pure water and dried by cool air to prepare the respective specimens for determining the contact resistance and the surface roughness.

The conditions of immersion in the acidic aqueous solution were the following.

Condition A: Immersion in an aqueous solution containing 25% by mass of nitric acid at 60° C. for 1 hour Condition B1: Immersion in an aqueous solution containing 10% by mass of nitric acid and 30% by mass of hydrochloric acid at 55° C. for 60 seconds, (for the ferritic stainless steel sheet)

Condition B2: Immersion in an aqueous solution containing 10% by mass of nitric acid and 20% by mass of hydrochloric acid at 55° C. for 60 seconds, (for the austenitic stainless steel sheet)

Condition B3: Immersion in an aqueous solution containing 5% by mass of nitric acid and 30% by mass of hydrochloric acid at 40° C. for 10 seconds, (for the industrial pure titanium sheet)

Condition B4: Immersion in an aqueous solution containing 7% by mass of nitric acid and 2% by mass of hydrofluoric acid at 55° C. for 60 seconds, (for the ferritic stainless steel sheet)

Condition A is a known one as the passivation treatment, and was executed for reference, though the condition affects very little the adjustment of surface roughness.

Condition B4 is a pickling condition which is conventionally adopted aiming at descaling and the like after annealing.

Figure 2:
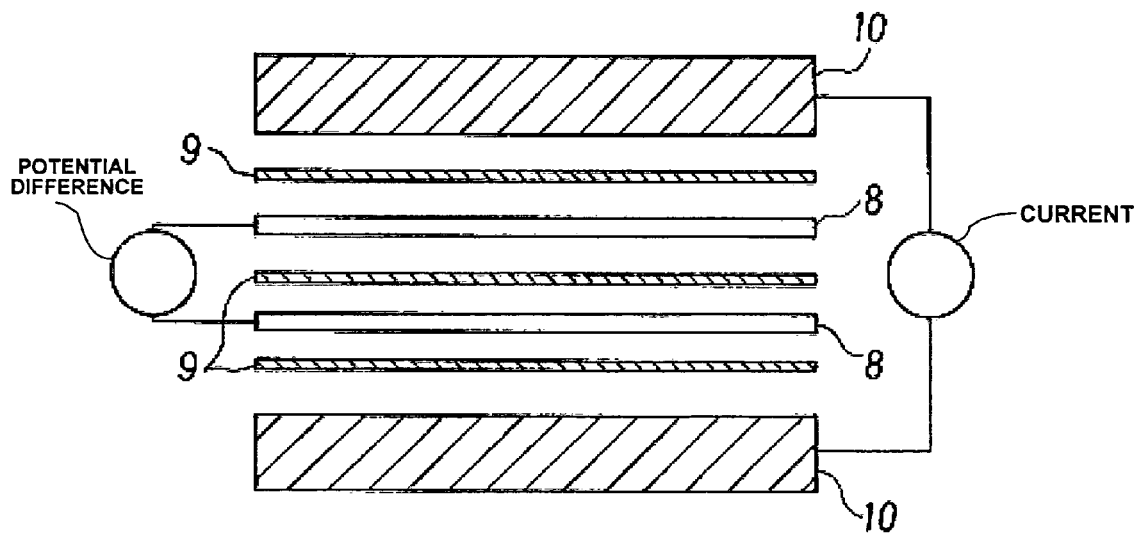
FIG. 2 is a cross sectional view illustrating the method to determine the contact resistance.

Determination of the contact resistance was conducted, as illustrated in FIG. 2, by sandwiching each of two sheets of specimens 8 between each of three sheets of carbon papers 9 (TGP-H-120, made by Toray Industries, Inc.) having the same size to that of the specimen, alternately, then by letting the outer faces of thus formed sandwich body contact with the respective electrodes 10 made of gold-plated copper sheet, thereby determining the resistance between the specimens 8 under a pressure of 137.2 N/cm² (14 kgf/cm²). The thus determined value was multiplied by the contact surface area, and further was divided by the number of the contact faces (=2) to obtain the contact resistance.

The determination of contact resistance was given by an average of six observed values while exchanging the specimens 8 of two sheets as a unit, being treated by the same condition, at every time. The average value for the ferritic stainless steel sheet is given in Table 1, that for the austenitic stainless steel sheet is given in Table 2, and that for the pure titanium sheet is given in Table 3.

For reference examples, similar determination was given to a stainless steel sheet (0.3 mm in thickness, equivalent to SUS304) with gold plating (about 0.1 µm in thickness) thereon, and to a graphite sheet (5 mm in thickness), thus determining the contact resistance. The results are shown in Table 1, Table 2, and Table 3.

The determination of surface roughness was given after the surface roughness adjustment, using a contact stylus instrument and a scanning electron microscope.

The contact stylus profilometry was given in accordance with JIS B0601-1994, using a stylus having 2 µm of tip radius, and applying 0.8 mm of cutoff value and sampling length of the high-pass filter, 2.5 µm of cutoff value of the low-pass filter, and 4.0 mm of evaluation length, thereby determining the arithmetic average surface roughness Ra and the root mean square slope of the surface roughness profile $\Delta q$. The determination direction was orthogonal to the polishing direction. Similar observations were given at 5 positions, and the average of them was derived. The results are given in Table 1, Table 2, and Table 3.

The surface roughness determination by a scanning electron microscope was done by a scanning electron microscope (S-4100, Hitachi, Ltd.) which has a function to determine the surface irregularities based on the intensity of backscattered electrons. That is, from a backscattered electron image (irregularities image) photographed at 10000 magnification, twenty of roughness profiles having 10 µm in length were prepared at 0.5 µm of interval, thus calculated the mean spacing S2 of local peaks.

Observation of backscattered electron image to calculate S2 was given at six positions. Among these six positions, three positions provided the roughness profile in the same direction to the polishing direction, while other three directions provided the roughness profile in the direction orthogonal to the polishing direction. The average value of these S2 at six positions was adopted as the mean spacing S2 of local peaks for each specimen. On preparing the surface roughness profile, the wavelength component having smaller than 0.02 µm of spacing and the wavelength component having longer than 10 µm of spacing were eliminated using a low-pass filter and a high-pass filter of the frequency analyzing software, respectively. As a result, the lower limit of the spacing Si of local peaks became 0.02 µm. In addition, the discriminated value in the height direction to recognize the local peak 13 was selected to 0.01 µm. The results are given in Table 1, Table 2, and Table 3. Furthermore, the ferritic stainless steel sheet was treated by Condition B1 and Condition B4, separately, and was observed by SEM. The result is shown in FIG. 5A and FIG. 5B, respectively.

As clearly shown in Table 1, Table 2, and Table 3, for all the tested metallic materials, or the ferritic stainless steel sheet, the austenitic stainless steel sheet, and the industrial pure titanium sheet, the average value of Ra, among the indexes of surface roughness, determined by the contact stylus roughness meter is independent of the conditions of surface roughness adjustment, though it varies with the conditions of wet polishing. On the other hand, the mean spacing S of local peaks 13 observed by the scanning electron microscope is independent of the conditions of wet polishing, though it varies with the conditions of surface roughness adjustment. Furthermore, the contact resistance depends not significantly on the conditions of wet polishing, though it varies with the conditions of surface roughness adjustment. That is, the contact resistance was found to have strong correlation with the mean spacing S of local peaks 13. Also it was found that the contact resistance becomes further small if only the root mean square slope of the surface roughness profile $\Delta q$ is 0.05 or larger.

Figure 5A:
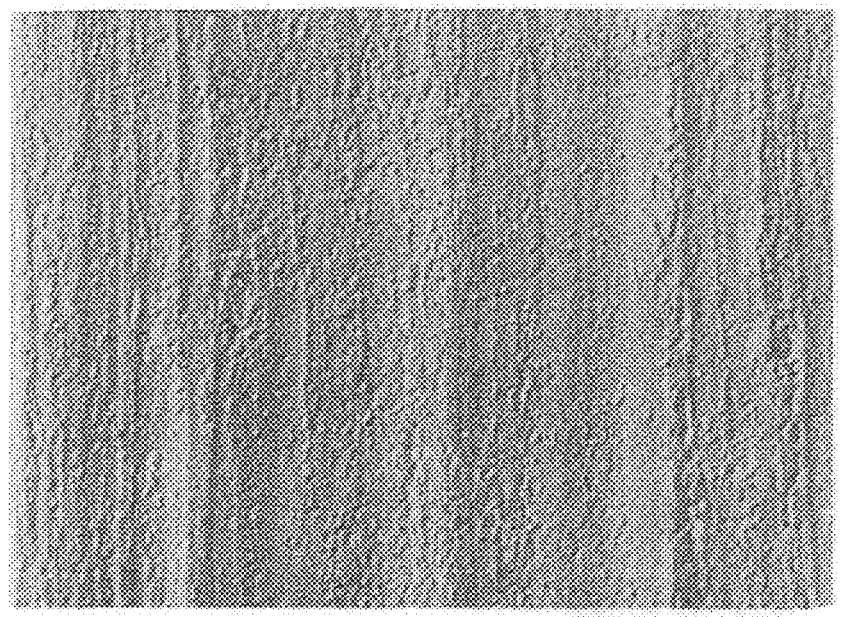
FIGS. 5A and 5B shows show SEM photographs, after our roughness treatment according to Condition B1 and Condition B4, respectively, as those conditions are described below, and after ordinary pickling treatment.
Figure 5B:
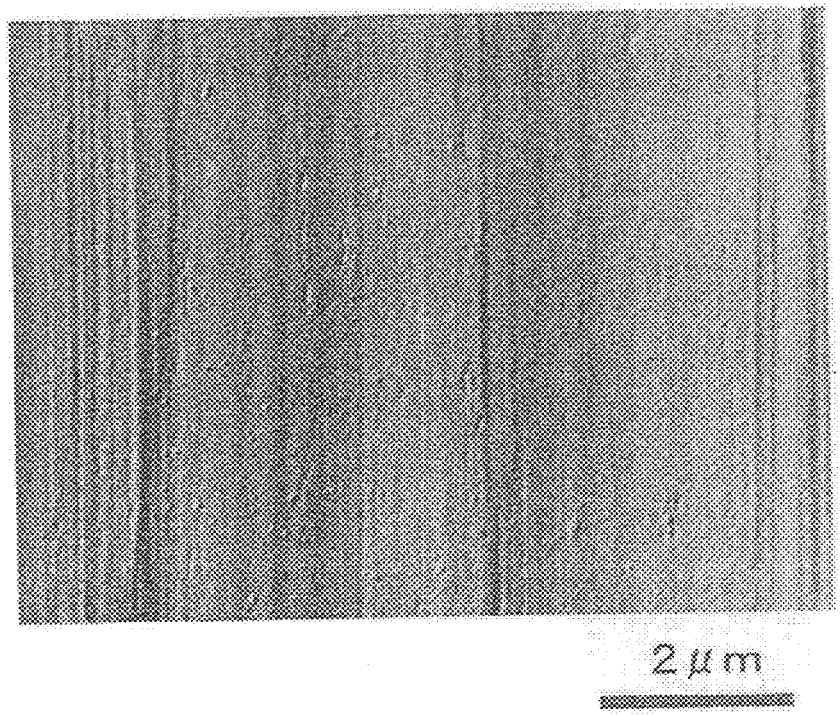

As seen in the SEM images (backscattering electron irregularities images) given in FIG. 5A and FIG. 5B, comparison of the treatment between the immersion condition B1 and the immersion condition B4 which is an ordinary pickling condition showed that the fine irregularities of submicron order were formed only in the case of the immersion condition B1. On the other hand, the surface after ordinary pickling treatment, (refer to FIG. 5B), gave no fine irregularities of submicron order which was observed in our treatment. Consequently, ordinary conventional pickling conditions cannot provide the metallic surface having the fine irregularities of submicron order observed in our case.

Furthermore, as seen in Table 1 and Table 2, the metallic materials of both the ferritic stainless steel sheet and the austenitic stainless steel significantly decrease the contact resistance to 20 m$\Omega$·cm$^2$ or smaller if only the S value is 0.3 µm or smaller. When the contact resistance is decreased to 20 m$\Omega$·cm$^2$ or smaller, no adverse effect arises as the separator for fuel cell, and the separator can be used without problem.

When, simultaneously, $\Delta q$ is 0.05 or larger, the contact resistance becomes further small, reaching 10 m$\Omega$·cm$^2$ or smaller.

Also for titanium (industrial pure titanium), as shown in Table 3, although the contact resistance increases after 30 days and 100 days from the treatment owing to the growth of film, the contact resistance becomes 20 m$\Omega$·cm$^2$ or smaller even after 100 days if the value of S is 0.3 µm or smaller. Although the contact resistance of titanium is higher than that of stainless steels, the titanium can be used as the separator for fuel cell without problem if only the contact resistance is 20 m$\Omega$·cm$^2$ or smaller.

In the related art, it was understood that the contact resistance of metallic materials forming a passive film thereon is difficult to decrease. Our experiments, however, derived a new finding that the contact resistance can be significantly decreased by adjusting the mean spacing S of local peaks at submicron pitches. There is a known technology to decrease the contact resistance by adjusting the arithmetic average surface roughness Ra to a specific range, (refer to JP-A-2002-270196). We, however, have derived a new finding that Ra is not necessarily a governing variable to determine the contact resistance and that the contact resistance can be significantly decreased rather by maintaining the mean spacing Si of local peaks 13 to an adequate range, as described before. The description in the following begins with the characteristics required to the metallic material as the base material of the separator of a proton-exchange membrane fuel cell.

Kind of the Metallic Material:

A preferred conductive member required to have high durability and electric conductivity, particularly a metallic material for separator in a proton-exchange membrane fuel cell is a metallic material having a property to easily form a passive film thereon. In particular, stainless steel, pure titanium, and titanium alloy, which form a very thin passive film, as small as several nanometers, are preferred because they give extremely strong corrosion resistance. Although aluminum and aluminum alloy also form a passive film thereon, they are difficult to be applied to a separator for fuel cell because their film has small electric conductivity and their corrosion resistance is insufficient under operating environment of the fuel cell. Nevertheless, their contact resistance can be decreased by surface roughness adjustment so that they can be used other applications than for a separator of fuel cell.

Mean Spacing of Local Peaks: 0.3 µm or Smaller

The surface roughness of a metallic material for separator is an important variable to decrease the contact resistance. The mean spacing S of local peaks is adopted as the index of surface roughness of metallic material for separator. By maintaining the value of 5 to 0.3 µm or smaller, the contact resistance can be decreased to 20 m$\Omega$·cm$^2$ or smaller. With the contact resistance of 20 m$\Omega$·cm$^2$ or smaller, the metallic material can be used as the separator for a proton-exchange membrane fuel cell without problem.

As described before and as shown in FIG. 5A and FIG. 5B, the metal surface having submicron order of fine irregularities, as obtained by us, cannot be prepared by conventional ordinary pickling condition. The reason of attaining that fine irregularities is presumably that the passive film is locally destructed by the roughness adjustment, as described later, and that the passive film and the base metal surface are locally dissolved, and then a passive film is regenerated, thereby forming fine irregularities of submicron order thereon.

Although the reason of decreasing the contact resistance by maintaining the mean spacing of local peaks to 0.3 μm or smaller is not fully analyzed, a presumable reason is the following.

The carbon paper used as the gas diffusion layer of proton-exchange membrane fuel cell is made from carbon fibers having about 6 μm in fiber diameter, and the real contact part with the separator is only a portion of the apparent contact area. Although the contact part is a point-contact in macroscopic view, the surface of carbon paper at each contact point is not flat in microscopic view. Consequently, smaller S gives larger contact area at the microscopic contact part, thus presumably attaining small contact resistance. Since the surface of materials other than carbon paper is not flat in microscopic view, similar effect should be attained.

To derive the mean spacing S of local peaks 13, the spacing Si of local peaks 13 has to be determined. The value Si is determined by a method which has 0.1 μm or smaller resolution in the horizontal direction (or lateral direction to the roughness profile) and has 0.1 μm or smaller resolution in the vertical direction (or height direction to the roughness profile), thereby not-detecting the wavelength component of smaller than 0.02 μm on the roughness profile, or is determined by observation after eliminating smaller than 0.02 μm of wavelength component using a filter. For example, the spacing Si of local peaks 13 is determined by enlarging the image of roughness profile to 10000 or larger magnification using a scanning electron microscope, then by calculating the average value S. The number and position of measurements of Si value are not specifically limited, and they may be adequately selected depending on the measuring method, the size of measuring specimen, and the like for determining the Si value.

Applicable method to adjust the S value to a specified range so as the mean spacing S of local peaks to become 0.3 μm or smaller may be immersion in an acidic aqueous solution or electrolysis.

The treatment method is not the one adopted in the related art (pickling) in which the base material including the passive film is uniformly eliminated, but preferably the one conducted under a condition to locally destruct the passive film at submicron order or finer spacing. However, it is necessary to avoid a condition to generate deep pitting in the metal. It is required to select the preferable range of concentration of solution, temperature, and immersion time. The preferred ranges, however, differ with the composition of the metallic material being treated and the composition of the passive film being formed thereon. For example, a preferable method is to use an optimum solution composition, concentration range, and temperature range, which allow local destruction of the passive film within a short immersion period.

In the case of immersion, for example, hydrochloric acid, hydrofluoric acid, or a mixture of nitric acid with hydrochloric acid or hydrofluoric acid (mixed acid) may be applied. Compared with a mixed acid which is used in ordinary pickling, however, the concentration of hydrochloric acid or hydrofluoric acid has to be increased. As given in the experimental examples, a 30Cr-2Mo steel obtained good result by a mixed acid of [10% nitric acid+30% hydrochloric acid] at 55° C. for 60 seconds.

The surface roughness adjustment, however, is not limited to the above examples.

Adjustment of surface roughness of the metallic material for separator is preferably given after forming the separator because the making of separator (press-forming, for example) after adjusting the surface roughness may change the surface roughness. Nevertheless, if a forming method which does not affect the surface roughness on a side of the metallic material for separator contacting with the gas diffusion layer, (or a forming method that maintains the preliminarily adjusted S value), is applicable, the surface roughness of the metallic material for separator may be adjusted before making the separator.

Root Mean Square Slope of the Surface Roughness Profile Δq: 0.05 or Larger

To attain further small contact resistance, it is preferable, adding to the above-described optimization of mean spacing S of local peaks, to keep the root mean square slope of the surface roughness profile Δq to 0.05 or larger. The Δq is a parameter representing the slope of surface roughness profile. As described before, the contact part between the separator and the carbon paper is only a small portion of the apparent contact area, and the contact part is regarded as a point-contact in macroscopic view. If the value of Δq is excessively small, the number of point-contacts becomes small, thus presumably failing to attain further small contact resistance. The satisfactory values of Δq are 0.05 or larger in at least one direction. Similar effect is attained for materials other than carbon paper by the effect of increased number of contact points.

As described before, the determination of root mean square slope of the surface roughness profile Δq is conducted in accordance with JIS B0601-1994, using a contact stylus roughness meter having a stylus of 2 μm in tip radius, and applying 0.8 mm of cutoff value and sampling length of the high-pass filter, 2.5 μm of cutoff value of the low-pass filter, and 4.0 mm of evaluation length, thereby determining the arithmetic average surface roughness Ra and the root mean square slope of the surface roughness profile Δq. When the metallic material is rolled or polished, it is sufficient that the value of Δq is 0.05 or larger at least in one direction so that the determination is given in the direction orthogonal to the rolling direction or the polishing direction of giving larger Δq.

By manufacturing a proton-exchange membrane fuel cell using thus formed separator made of metallic material, the obtained proton-exchange membrane fuel cell gives small contact resistance, high power generation efficiency, and high durability.

Following is the description about the reasons to limit the ingredients of ferritic stainless steel for the separator.

C, 0.03% or Less, N, 0.03% or Less, (C+N): 0.03% or Less, by Mass

Both C and N react with Cr in the ferritic stainless steel for separator to form a compound to precipitate as Cr carbonitride in the grain boundaries, thereby deteriorating the corrosion resistance. Accordingly, smaller content of C and N is more preferable. If the C content is 0.03% or less and the N content is 0.03% or less, by mass, the corrosion resistance is not significantly deteriorated. If the content of (C+N) exceeds 0.03% by mass, the ductility of ferritic stainless steel for separator decreases, thus likely inducing cracks during making of the separator. Therefore, the C content is specified to 0.03% or less by mass, the N content is specified to 0.03% or less by mass, and the (C+N) content is specified to 0.03% or less by mass. Preferably, the C content is specified to 0.015% or less by mass, the N content is specified to 0.015% or less by mass, and the (C+N) content is specified to 0.02% or less by mass.

Cr: 16 to 45% by Mass

Chromium is a necessary element to assure the basic corrosion resistance as the ferritic stainless steel sheet. If the Cr content is less than 16% by mass, the separator cannot endure a long period of service. On the other hand, if the Cr content exceeds 45% by mass, the toughness decreases by the precipitation of σ phase. Accordingly, the Cr content has to satisfy the range from 16 to 45% by mass, and preferably from 18 to 35% by mass.

Mo: 0.1 to 5.0% by Mass

Molybdenum is an effective element to suppress local corrosion such as crevice corrosion of the ferritic stainless steel for separator. To attain the effect, the Mo content has to be 0.1% or more by mass. If the Mo content exceeds 5.0% by mass, however, the ferritic stainless steel for separator becomes significantly brittle, which deteriorates the productivity. Consequently, the Mo content has to satisfy the range from 0.1 to 5.0% by mass, and preferably from 0.5 to 3.0% by mass.

To the ferritic stainless steel for separator, following elements may be added, at need, adding to the limited quantity of C, N, Cr, Mo, and (C+N).

Si: 1.0% or Less by Mass

Silicon is an effective element for deoxidization, and is added in the smelting stage of the ferritic stainless steel for separator. To attain the effect, the Si content is preferably 0.01% or more by mass. However, excess Si content hardens the ferritic stainless steel for separator, thus deteriorating the ductility thereof. Therefore, if Si is added, the content is preferably 1.0% or less by mass, and more preferably in a range from 0.01 to 0.6% by mass.

Mn: 1.0% or Less by Mass

Since Mn binds with S which unavoidably enters the steel, and provides the effect of decreasing the solid solution S in the ferritic stainless steel for separator, Mn is an effective element to suppress the grain boundary segregation of S and to prevent crack occurrence during hot-rolling. The effect is attained at the Mn content ranging from 0.001 to 1.0% by mass. Accordingly, when Mn is added, the Mn content is preferably 1.0% or less by mass, and more preferably from 0.001 to 0.8% by mass.

Cu: 3.0% or Less by Mass

Copper is an element effective to improve the corrosion resistance of the ferritic stainless steel for separator, and Cu is added at need. If, however, the Cu content exceeds 3.0% by mass, the hot-workability deteriorates to decrease the productivity. Consequently, when Cu is added, the Cu content is preferably 3.0% or less by mass, and more preferably from 0.01 to 2.5% by mass.

At Least One of Ti, Nb, V, and Zr: 0.01 to 0.5% by Mass as the Sum of them

All of Ti, Nb, V, and Zr react with C and N in the ferritic stainless steel for separator to form the respective carbonitrides. Since Ti, Nb, V, and Zr fix C and N in that manner, they are effective elements (to prevent the deterioration of corrosion resistance accompanied with the Cr carbonitride precipitation, and further) to improve the press-formability of the ferritic stainless steel for separator. When the content of (C+N) is 0.03% or less by mass, the effect of improving the press-formability in the case of adding any of Ti, Nb, V, and Zr is attained at each 0.01% or more by mass. The effect to improve the press-formability with the addition of all of Ti, Nb, V, and Zr is attained at 0.01% or more by mass as the total content thereof. On the other hand, when Ti, Nb, V, and Zr are added by above 0.5% each by mass, and by above 0.5% by mass as the total thereof, the effect saturates. Therefore, when at least one of Ti, Nb, V, and Zr is added, the sum of their contents is preferably in a range from 0.01 to 0.5% by mass.

To the above elements, there may be added Ca, Mg, and rare earth element (what is called REM) at each 0.1% or less by mass, to improve the hot-workability of the ferritic stainless steel for separator, and further Al at 0.2% or less by mass for deoxidization in the molten steel stage. Furthermore, Ni may be added at 1% or less by mass to improve the toughness of the ferritic stainless steel for separator.

Other elements are balance Fe and inevitable impurities.

Following is the description about a preferred method for manufacturing ferritic stainless steel. The method for smelting the ferritic stainless steel is not specifically limited, and all the known smelting methods are applicable. For example, it is preferred to smelt the steel by a converter, followed by secondary refining by strongly stirred vacuum oxygen decarburization (SS-VOD) process. A preferred casting method is continuous casting process in view of productivity and quality. The slab obtained by casting is heated to temperatures, for example, ranging from 1000° C. to 1250° C. and is treated by hot-rolling to a hot-rolled sheet having a specified thickness. The hot-rolled sheet is subjected to annealing at temperatures ranging from 800° C. to 1150° C., and pickled, further subjected to cold-rolling to a specified thickness, or preferably further annealed at temperatures ranging from 800° C. to 1150° C., or further pickled to obtain the product. During the cold-rolling step, two or more cycles of cold-rolling including interim annealing, at need, may be given depending on the production requirement. For some uses, a light skin pass rolling or the like is applied after cold-rolling and annealing. The thus obtained stainless steel sheet is treated by press-forming or the like to form a gas flow channel, which is then preferably treated by surface roughness adjustment to form the separator. Alternatively, the separator may be made by forming the gas flow channel applying cutting work to as hot-rolled sheet or to annealed hot-rolled sheet. Adjustment of surface roughness of the metallic material for separator is preferably given after forming the separator because the making of separator (press-forming, for example) after adjusting the surface roughness may change the surface roughness. Nevertheless, if a forming method which does not affect the surface roughness on a side of the metallic material for separator contacting with the gas diffusion layer, (or a forming method that maintains the preliminarily adjusted S value), is applicable, the surface roughness of the metallic material for separator may be adjusted before making the separator.

Preferable conditions of surface roughness adjustment are described later.

Following is the description about the reasons to limit the ingredients of the austenitic stainless steel for separator.

C, 0.03% or Less by Mass

Carbon reacts with Cr in the austenitic stainless steel for separator to form a compound to precipitate Cr carbonitride in the grain boundaries, thereby deteriorating the corrosion resistance. Accordingly, smaller content of C is more preferable, and 0.03% or less by mass of C content does not significantly decrease the corrosion resistance. Therefore, the C content is specified to 0.03% or less by mass, and preferably 0.015% or less by mass.

Cr: 16 to 30% by Mass

Chromium is a necessary element to assure the basic corrosion resistance of the austenitic stainless steel sheet. If the Cr content is less than 16% by mass, the separator cannot endure the long period of service. On the other hand, if the Cr content exceeds 30% by mass, austenite structure becomes difficult to obtain. Accordingly, the Cr content has to satisfy the range from 16 to 30% by mass, and preferably from 18 to 26% by mass.

Mo: 0.1 to 10.0% by Mass

Molybdenum is an effective element to suppress local corrosion such as crevice corrosion of the austenitic stainless steel for separator. To attain the effect, the Mo content has to be 0.1% or more by mass. If the Mo content exceeds 10.0% by mass, however, the stainless steel for separator becomes significantly brittle, which deteriorates the productivity. Consequently, the Mo content has to satisfy the range from 0.1 to 10.0% by mass, and preferably from 0.5 to 7.0% by mass.

Ni: 7 to 40% by Mass

Nickel is an element to stabilize the austenite phase. If the Ni content is less than 7% by mass, the effect to stabilize the austenite phase cannot be attained. On the other hand, if the Ni content exceeds 40% by mass, excess amount of Ni is consumed to increase the cost. Consequently, the Ni content has to satisfy the range from 7 to 40% by mass.

The austenitic stainless steel for separator may further contain the elements given below, at, need, adding to C, Cr, Mo, and Ni.

N, 2.0% or Less by Mass

Nitrogen is an element to suppress local corrosion of the austenitic stainless steel for separator. To add N over 2.0% by mass is, however, difficult from the industrial point of view. Accordingly, 2.0% by mass is specified as the upper limit of the N content. In an ordinary smelting method, more than 0.4% by mass of N content needs a long time to add N in the smelting stage of stainless steel for separator, which deteriorates the productivity. Therefore, in view of cost, 0.4% or less by mass is more preferable, and 0.01 to 0.3% by mass is most preferable.

Cu: 3.0% or Less by Mass

Copper is an element to improve the corrosion resistance of the austenitic stainless steel for separator. To attain the effect, the Cu content of 0.01% or more by mass is preferred. If, however, the Cu content exceeds 3.0% by mass, the hot-workability deteriorates to decrease the productivity. Consequently, when Cu is added, the Cu content is preferably 3.0% or less by mass, and more preferably from 0.01 to 2.5% by mass.

Si: 1.5% or Less by Mass

Silicon is an effective element for deoxidization, and is added in the smelting stage of the austenitic stainless steel for separator. To attain the effect, the Si content is preferably 0.01% or more by mass. However, excess Si content hardens the austenitic stainless steel for separator, thus deteriorating the ductility thereof. Therefore, if Si is added, the content is preferably 1.5% or less by mass, and more preferably in a range from 0.01 to 1.0% by mass.

Mn: 2.5% or Less by Mass

Since Mn binds with S which unavoidably enters the steel, thus providing the effect of decreasing the solid solution S in the austenitic stainless steel for separator, Mn is an effective element to suppress the grain boundary segregation of S and to prevent crack occurrence during hot-rolling. The effect is attained at the Mn content ranging from 0.001 to 1.0% by mass. Accordingly, when Mn is added, the Mn content is preferably 2.5% or less by mass, and more preferably from 0.001 to 2.0% by mass.

At Least One of Ti, Nb, V, and Zr: 0.01 to 0.5% by Mass as the Sum of them

All of Ti, Nb, V, and Zr react with C in the austenitic stainless steel to form the respective carbides. Since Ti, Nb, V, and Zr fix C in this manner, they are effective elements to improve the intergranular corrosion resistance of the austenitic stainless steel for separator. If the C content is 0.03% or less by mass, the effect to improve the corrosion resistance by the addition of any of Ti, Nb, V, and Zr appears at the addition of one or more of Ti, Nb, V, and Zr at amounts of each 0.01% or more by mass. The effect to improve the corrosion resistance in the case of adding Ti, Nb, V, and Zr appears at 0.01% or more by mass of the total content of Ti, Nb, V, and Zr.

On the other hand, when Ti, Nb, V, and Zr are added by the amounts of above 0.5% each by mass and of sum of more than 0.5% by mass, the effect saturates. Therefore, if one or more of Ti, Nb, V, and Zr is added, the sum of them is preferably in a range from 0.01 to 0.5% by mass.

To the above elements, there may be added Ca, Mg, and rare earth element (what is called REM) at each 0.1% or less by mass, to improve the hot-workability of the austenitic stainless steel for separator, and further Al at 0.2% or less by mass for deoxidization in the molten steel stage.

Other elements are balance Fe and inevitable impurities.

Following is the description about a preferred method for manufacturing austenitic stainless steel.

The method for smelting the stainless steel for separator is not specifically limited, and all the known smelting methods are applicable. For example, it is preferred to smelt the steel by a converter, followed by secondary refining by strongly stirred vacuum oxygen decarburization (SS-VOD) process. A preferred casting method is continuous casting process in view of productivity and quality. The slab obtained by casting is heated to temperatures, for example, ranging from 1000° C. to 1250° C., and is treated by hot-rolling to a hot-rolled sheet having a specified thickness. The hot-rolled sheet is subjected to annealing at temperatures ranging from 800° C. to 1150° C., and pickled, further subjected to cold-rolling to a specific thickness, or preferably further annealed at temperatures ranging from 800° C. to 1150° C., or still further pickled to obtain the product. During the cold-rolling step, two or more cycles of cold-rolling including interim annealing, at need, may be given depending on the production requirement. For some uses, a light skin pass rolling or the like is applied after cold-rolling and annealing. Thus obtained stainless steel sheet is treated by press-forming or the like to form a gas flow channel, which is then preferably treated by surface roughness adjustment to form the separator. Alternatively, the separator may be made by forming the gas flow channel applying cutting work to as hot-rolled sheet or to annealed hot-rolled sheet. Adjustment of surface roughness of the stainless steel for separator is preferably given after forming the separator because the making of separator (press-forming, for example) after adjusting the surface roughness may change the surface roughness. Nevertheless, if a forming method which does not affect the surface roughness on a side of the stainless steel for separator contacting with the gas diffusion layer, (in other words a forming method that maintains the preliminarily adjusted S value), is applicable, the surface roughness of the stainless steel for separator may be adjusted before making the separator.

Preferable conditions of surface roughness adjustment are described later.

Although the structure and chemical composition of titanium and titanium alloy are not specifically limited, 70% or more by mass of Ti is preferred to obtain a passive film consisting mainly of titanium oxide which shows high corrosion resistance. Furthermore, various elements may be added to improve corrosion resistance, strength, formability, and the like.

The reasons to specify the detail structure and composition of the titanium (industrial pure titanium, hereinafter referred to as titanium) or titanium alloy are described below.

Structure of Titanium and Titanium Alloy:

The structure of titanium and titanium alloy is not specifically limited.

The structure of titanium is α phase (hexagonal close-packed structure (hcp)) at 882° C. or lower temperatures, and β phase (body-centered cubic structure (bcc)) at above 882° C. Titanium is a material giving small work-hardening and having high plastic-workability among the hexagonal system metals, though having less number of sliding systems under plastic deformation. In addition, titanium is generally inexpensive compared with titanium alloys. Therefore, titanium is a preferred material for forming the separator.

On the other hand, the structure of titanium alloys is classified into three groups: α type consisting mainly of α phase; β type consisting mainly of β phase; and (α+β) type composed of α phase and β phase. The structure of titanium alloy is determined by the kind and quantity of alloying element being added to the pure titanium, the working method, and the heat treatment. Since the property differs between the α phase and the β phase, the characteristics significantly differ with the kind of alloy. The (α+β) type alloy shows superplasticity so that it can be formed to the separator, by superplastic formation, and the β type alloy has excellent cold plastic-workability so that it can be formed to the separator by cold-working such as press-forming, both of which alloys are preferable.

The chemical composition of titanium is specified in the following.

Titanium:

The titanium is industrial pure titanium, and existing elements other than Ti is impurities. The impurities include Fe, O, C, N, and H. As of these impurities, O and Fe are specifically added to increase the strength, in some cases. Although larger content of O and Fe further increase the strength, the effect saturates at above 1% of the sum of them. Accordingly, the sum of O and Fe contents is preferably 1% or less, with balance of Ti.

The chemical composition of titanium alloy is specified below.

Ti: 70% or More by Mass

To attain a passive film consisting mainly of titanium oxide which has high corrosion resistance, 70% or more by mass of Ti is preferred.

Al: 0.5 to 9% by Mass

Aluminum is added to the titanium alloy as an element to stabilize the α phase, and contributes to the strength increase without deteriorating the corrosion resistance. To attain the effect, 0.5% or more by mass of Al content is preferred. If the Al content exceeds 9% by mass, a brittle phase precipitates to increase the hot deformation resistance and to significantly increase the sensitivity to cracks, which deteriorates the manufacturing performance. The range of Al content is preferably from 0.5 to 7% by mass.

The titanium alloy may contain the following elements, as needed, adding to the above elements.

Each of One or More of Fe, Ni, Co, and Cr: 0.2 to 3% by Mass

Each of Fe, Ni, Co, and Cr is an element to stabilize the eutectoid β phase, and particularly becomes solid solution in the β phase to increase the strength. By lowering the β transformation point, the temperature to generate superplasticity is lowered. These elements give high diffusion rate in the titanium. By increasing the volume percentage of the β phase which has good hot-workability, the deformation resistance decreases during hot-working, particularly during superplastic forming stage, thus suppressing the generation of defects such as cracks. To attain these effects, each of Fe, Ni, Co, and Cr preferably has 0.2% or more by mass of content. If each of Fe, Ni, Co, and Cr exceeds 3% by mass of content, there are formed the respective intermetallic compounds, which are brittle phases, with Ti, and further formed a segregated phase called the β-fleck during smelting and solidifying stages, thereby deteriorating the alloy mechanical properties, specifically ductility. Consequently, the content of one or more of Fe, Ni, Co, and Cr is preferably in a range from 0.2 to 3% by mass.

Mo and V: 1 to 25% by Mass as the Sum of them

Molybdenum and V are elements to stabilize the complete solid solution type β phase, and increase the strength by becoming solid solution mainly in the β phase. To attain the effect, 1% or more by mass of the sum of them is preferred. If, however, the sum exceeds 25% by mass, the effect saturates. Since Mo and V are heavy elements and are expensive, addition of them over 25% by mass is not preferable. Furthermore, Mo has small diffusion rate in titanium so that the deformation stress increases during hot-working, particularly during superplastic formation. Therefore, the content of Mo and V is preferably from 1 to 25% by mass as the sum of them.

O: 0.05 to 0.5% by Mass

Oxygen forms solid solution in the α phase to increase the strength. To attain the effect, the O content is preferably 0.05% or more by mass. If, however, the O content exceeds 0.5% by mass, the cold-workability and the ductility deteriorate. Accordingly, the O content is preferably in a range from 0.05 to 0.5% by mass.

One or More of Zr and Sn: 0.2 to 6% by Mass as the Sum of them

Zirconium and Sn are added to titanium alloy as neutral elements, and increase the strength without decreasing the ductility and without deteriorating corrosion resistance. In addition, Zr and Sn improve the erosion resistance. To attain these effects, the sum of Zr and Sn is preferably 0.2% or more by mass. If, however, the sum of Zr and Sn exceeds 6% by mass, the desired effects cannot be attained. Therefore, the sum of Zr and Sn is preferably in a range from 0.2 to 6% by mass.

Furthermore, the titanium alloy may further contain following elements, at need, adding to the above specified elements.

Si: 0.5% or Less by Mass

Silicon is an element effective to improve the erosion resistance, and is added in the smelting step of titanium alloy. Excess addition of Si, however, induces formation of an intermetallic compound with Ti, which decreases the ductility. Accordingly, when Si is added, 0.5% or less by mass of Si content is preferable, and 0.05 to 0.5% by mass is more preferable.

One or More of Mn and Cu: 5% or Less by Mass as the Sum of them

Manganese is an element to stabilize the eutectoid β phase, and becomes solid solution mainly in the β phase to increase the strength. By lowering the β transformation point, the temperature to generate superplasticity is lowered. To attain these effects, one or more of Mn and Cu is preferably added by an amount of 0.2% or more by mass as the sum of them. If, however, the sum of Mn and Cu exceeds 5% by mass, there are formed the respective intermetallic compounds, which are brittle phases, with Ti, and further formed a segregated phase called the β-fleck during smelting and solidifying stages, thereby deteriorating the alloy mechanical properties, specifically ductility. Consequently, the content of one or more of Mn and Cu is preferably 5% or less by mass as the sum of them.

The titanium alloy may further contain Pd or Ru by an amount of 0.5% or less by mass, adding to the above composition. These Pd and Ru improve the corrosion resistance of titanium alloy. To attain the effect, each 0.01% or more by mass is preferred. These elements are, however, very expensive, and the excess addition of them increases the cost. Accordingly, the upper limit of these elements is specified to 0.5% by mass.

Other elements are balance Ti and inevitable impurities.

The following description is about a preferable method for manufacturing titanium or titanium alloy.

The titanium smelt or titanium alloy smelt having the above composition is subjected to block-forging or blooming to destruct the forged structure, thus establishing near-homogeneous structure, and further to hot-working such as hot-forging, hot-rolling, and hot-extruding into a desired shape. In this case, from the point of workability, there exists a temperature zone suitable for the hot-working and hot-rolling. Therefore, for the case of rolling a large cross sectional smelt or a sheet bar or the case of rolling into a thin material (hereinafter referred to as "thin sheet rolling"), a process in which an smelt or a sheet bar is heated by one cycle, followed by rolling to obtain the product is difficult to manufacture the desired product. Thus the multiple-heating rolling which applies rolling after reheating is preferred. The hot-rolled sheet is treated by annealing and descaling, followed by cold-rolling by a cold-rolling mill for large iron and steel service or stainless steel service, Sendzimir mill, or the like. The cold-rolled sheet is treated by annealing in a vacuum furnace or an inert gas atmosphere furnace to homogenize the mechanical properties and grain sizes over the whole sheet. In particular, the cold-rolling of $\alpha$ type titanium alloy and ($\alpha+\beta$) type titanium alloy is often difficult to roll compared with the pure titanium, thus the sheet bar is, in some cases, covered with a carbon steel on at least both sides thereof, and then applying hot-rolling (pack-rolling) to obtain the thin sheet. Although the $\beta$ type alloy has good cold-workability, the number of interim annealing cycles during cold-rolling may be increased to prevent edge crack and to prevent the generation of internal crack accompanied by excessive cold-rolling.

Thus obtained titanium or titanium alloy is preferably treated by press-forming, superplastic working, or the like to form a gas flow channel, followed by adjusting the surface roughness to make the separator. Alternatively, the separator may be made by forming the gas flow channel applying cutting work to as hot-rolled sheet or to annealed hot-rolled sheet. Adjustment of surface roughness of the titanium or titanium alloy for separator is preferably given after forming the separator because the making of separator (press-forming, for example) after adjusting the surface roughness may change the surface roughness. Nevertheless, if a forming method which does not affect the surface roughness on a side of the titanium or titanium alloy for separator contacting with the gas diffusion layer, (or a forming method that maintains the preliminarily adjusted S value), is applicable, the surface roughness of the titanium or titanium alloy for separator may be adjusted before making the separator.

Preferable conditions of the method to adjust the surface roughness are described later.

Surface Roughness Adjustment:

Applicable methods to locally destruct the passive film at submicron level, thus to bring the mean spacing S of local peaks to 0.3 µm or less include the immersion in an acidic aqueous solution and the electrolysis.

In the manufacturing process of stainless steel, what is called the pickling step is often conducted by immersion in various acids or mixed acid or by electrolysis to perform descaling. Aiming at the improvement in the corrosion resistance, various passivation treatments including pickling are known. However, to locally destruct the passive film thus to bring the mean spacing S of local peaks to 0.3 µm or less, aiming to improve the reduction in the contact resistance while improving the corrosion resistance, the adjustment of surface roughness through the immersion in an acidic solution requires an acid solution having quite different composition from that used in ordinary pickling.

The treatment method is preferably the one under a condition to locally destruct the passive film at submicron level, not the one in the related art to uniformly eliminate the passive film. It is necessary to determine the favorable concentration, range of temperature, and range of immersion time for the solution to conduct the treatment. These favorable ranges differ with the composition of metallic material being treated and the composition of passive film being formed on the surface of the metallic material. An example of preferred method is to select an optimum composition, range of concentration, and range of temperature to allow local destruction of the passive film within a short time of immersion.

According to our investigation, as described in the experiments, for example, when high Cr stainless steels such as a ferritic stainless steel or an austenitic stainless steel, having our composition range, are treated in an aqueous solution of (nitric acid+hydrochloric acid), good result is obtained by an acid solution containing hydrochloric acid by two times or more of concentration to the concentration of nitric acid.

For the case of aqueous solution of (nitric acid+hydrofluoric acid), good result is obtained by an acid solution containing hydrofluoric acid by one and a half times or more of concentration to the concentration of nitric acid. Preferable temperatures of the acid solution of (nitric acid+hydrochloric acid) aqueous solution and of (nitric acid+hydrofluoric acid) aqueous solution are 45° C. or above. Higher temperature of the acid solution allows shorter treatment time. The treatment solution applicable to our disclosure is, however, not limited to those described ones. The treatment by immersion allows selecting various acids, acid compositions, solution temperatures, immersion times, and the like depending on the composition, surface finish, and the like of base material stainless steel. The electrolytic treatment allows selecting various electrolyte compositions and electrolysis conditions (voltage, current, electrolyte temperature, treatment time, and the like).

The adjustment of surface roughness may be done before making the separator from the stainless steel sheet or may be done after making the separator. To maintain stably the mean spacing of local peaks to 0.3 µm or less, however, the roughness adjustment is preferably given after making the separator because the forming may change the surface roughness.

To pure titanium or titanium alloy, when the treatment was given by immersing the titanium or titanium alloy in (nitric acid+hydrochloric acid) or (nitric acid+hydrofluoric acid), three times or more of concentration of the hydrochloric acid to that of the nitric acid, or three times or more of concentration of the hydrofluoric acid to that of the nitric acid give good result. A preferable temperature of the acid solution for the cases of the (nitric acid+hydrochloric acid) aqueous solution or the (nitric acid+hydrofluoric acid) aqueous solution is 60° C. or below because above 60° C. induces rapidly reaction. Furthermore, also for the titanium or titanium alloy, the surface roughness adjustment may be done by electrolysis.

The surface roughness adjustment is not limited by the above examples.

To make the root mean square slope of the surface roughness $\Delta q$ to 0.05 or larger, polishing by emery paper, shot blasting, and the like may be applied. Alternatively, the surface roughness adjustment may be done by rolling, annealing and pickling after rolling, and the like. In the case that mirror-finish polishing is given to obtain high gloss, the $\Delta q$ is preferably adjusted by the above method.

When a proton-exchange membrane fuel cell is manufactured using thus formed separator made of thus prepared stainless steel, titanium, or titanium alloy, the fuel cell shows small contact resistance, high power generation efficiency, and high durability.

EXAMPLE 1

Ferritic stainless steels having the respective compositions shown in Table 4 were smelted by converter and secondary refining (SS-VOD process), which smelts were then casted by continuous casting process to prepare the respective slabs having 200 mm in thickness. Each of the slabs was heated to 1250° C., and was hot-rolled to prepare a hot-rolled stainless steel sheet having 4 mm of thickness, which sheet was then annealed (at temperatures from 850° C. to 1100° C.) and pickled, further treated by repeated cold-rolling, annealing at temperatures from 800° C. to 1050° C., and pickling to a thickness of 0.2 mm. After that, the stainless steel sheet was treated by bright annealing (BA) at temperatures from 800° C. to 1000° C. to obtain what is called the BA-finished annealed cold-rolled sheet.

Four pieces of specimen (200 mm×200 mm) were cut from each of the sheet-width center part and the longitudinal center part of thus prepared cold-rolled stainless steel sheet. Each specimen was press-formed to form a separator having a specified shape. Some of the separators were immersed in an acidic aqueous solution to adjust the surface roughness. The adjustment of surface roughness was conducted by immersing the specimen in the acidic aqueous solution containing 0 to 10% by mass of nitric acid and 3 to 30% by mass of hydrochloric acid or hydrofluoric acid, at 55° C. for 120 seconds.

The condition to make the mean spacing S of local peaks on the surface of separator to 0.3 μm or smaller differs with the composition of ferritic stainless steel as the base material of the separator. Accordingly, a preliminary experiment was conducted for the respective compositions of the ferritic stainless steel sheet to determine the optimum concentration of the acidic aqueous solution. The separator was immersed in the acidic aqueous solution prepared by mixing nitric acid with hydrochloric acid or hydrofluoric acid corresponding to thus determined optimum concentration, at 55° C. for 120 seconds.

Figure 4:
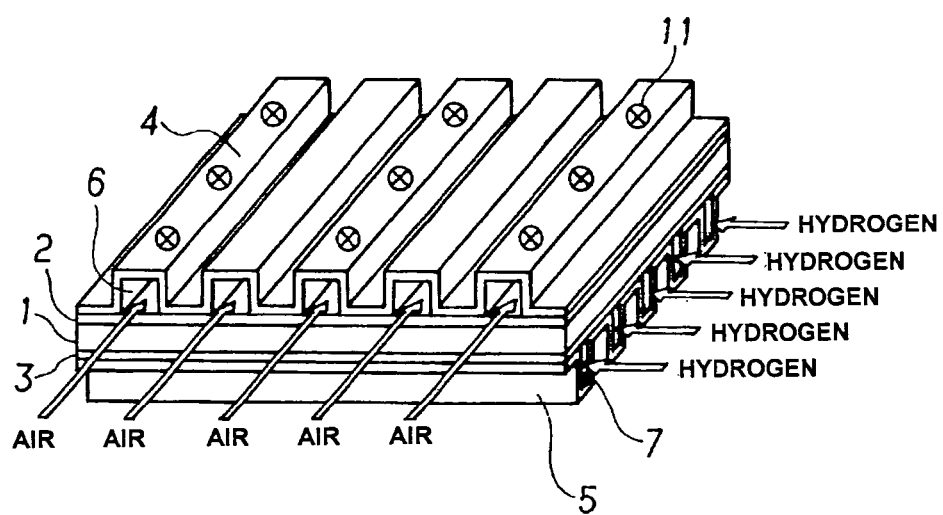
FIG. 4 is a perspective view illustrating the position of determination of the mean spacing of local peaks of the surface roughness profile on a separator.

Then, the mean spacing S of local peaks was determined as the index of surface roughness of the separator. That is, from a backscattering electron image photographed at 10000 magnification, prepared by backscattering electron method using a scanning electron microscope, twenty of roughness profiles having 10 μm in length were obtained at 0.5 μm of interval, and the spacing Si of local peaks was determined, thus calculating the average of Si values as the mean spacing S2 of local peaks. As shown in FIG. 4, the observation of backscattering electron image for calculating S2 was given at 9 positions. For preparing the roughness profile, three positions were parallel to the groove (channel), three positions were orthogonal thereto, and three positions were 45° thereto. The average value of those nine S2 values was adopted as the mean spacing S of local peaks 13 of each separator. On preparing the roughness profile, however, the wavelength component smaller than 0.02 μm of spacing was eliminated using a filter. As a result, the lower limit of the mean spacing S of local peaks became 0.02 μm. The observed result is given in Table 5. The S value of the separator after adjusting the surface roughness, in Table 5, is the value after immersing in the acidic aqueous solution.

The determination of root mean square slope of the surface roughness profile Δq was done by a contact stylus instrument. The measurement by the contact stylus instrument was conducted in accordance with JIS B0601, using a stylus having 2 μm of tip radius, and applying 0.8 mm of cutoff value and sampling length of the high-pass filter, 2.5 μm of cutoff value of the low-pass filter, and 4.0 mm of evaluation length, thereby determining the arithmetic average roughness Ra and the root mean square slope of the surface roughness profile Δq. The determination direction was parallel to the gas flow channel of the separator. Similar observations were given at 5 positions, and the average of them was derived.

The power generation characteristics were investigated using each of the separators treated by the surface roughness adjustment, (or the separator after adjusting the mean spacing S of local peaks), and the separator without adjusting the surface roughness.

For evaluating the power generation characteristics, the polymer membrane adopted Nafion (made by DuPont), and the gas diffusion layers 2 and 3 adopted a membrane-electrode assembly (MEA) 1 (FC50-MFA, made by Electro-Chem) having 50 cm$^2$ of integrated effective area, thus fabricated a single cell having a shape illustrated in FIG. 1. Both the air flow channel 6 and the hydrogen flow channel 7 of the single cell were in rectangular shape having 1 mm in height and 2 mm in width. Total 17 rows of the single cells were arranged. To the cathode, air was introduced. To the anode, ultrapure hydrogen (99.9999% by volume of purity) was supplied while being humidified by a bubbler kept to 80±1° C. Thus, the output voltage was determined after operating at 0.4 A/cm$^2$ of current density for 10 hours.

In addition, the output voltage after 1000 hours of continuous operation was determined under similar condition as above. During the power generation experiment of the single cell, the temperature of the single cell body was kept to 80±1° C. Also MEA 1, carbon paper 9, and other components were renewed at every change of specimen.

As the reference examples, single cells were fabricated. One of which cells used a separator prepared by gold plating (about 0.1 μm of thickness) on a stainless steel sheet (equivalent to SUS304) formed in similar shape to that of above Steel Nos. 1 to 10. Another cell used a separator made of graphite sheet (4 mm in thickness) having 17 rows of grooves (2 mm in width and 1 mm in depth) cut on one side of the sheet at 2 mm spacing. For each of thus fabricated cells, the output voltage was determined at 0.4 A/cm$^2$ of current density. The method for determining the output voltage was the same to that for above steel Nos. 1 to 10. The result is shown in Table 5.

As shown in Table 5, the single cells which used the separator made of cold-rolled stainless steel sheets (Steel Nos. 3 to 6, 9, and 10) satisfying our composition range were treated by surface roughness adjustment to 0.3 μm or smaller S values. Thus fabricated cells gave the output voltage, for both the one after 10 hours of operation (initial period) and the one after 1000 hours of operation, equivalent to the output voltage of the single cell which used the separator made of gold-plated stainless steel and of the single cell which used the separator made of graphite sheet. To the contrary, the single cells using the separators which were made by the respective cold-rolled steel sheets (Steel Nos. 3 to 6, 9, and 10) and which were not treated by surface roughness adjustment showed unsatisfactory power generation characteristics after 10 hours of operation.

On the other hand, the single cells using the separators prepared by the cold-rolled stainless steel sheets having compositions outside our range, (Steel Nos. 1, 2, 7, and 8), treated by the surface roughness adjustment to 0.3 μm or smaller S values gave unsatisfactory power generation characteristics after 1000 hours of operation, though the output voltage after 10 hours of operation (initial period) was equivalent to that of the single cells using the separator made of gold-plated stainless steel and that of the single cells using the separator made of graphite sheet. The single cells using the separators which were made of cold-rolled stainless steel sheets of Steel Nos. 1, 2, 7, and 8, and which were not treated by surface roughness adjustment gave unsatisfactory power generation characteristics after 10 hours of operation.

Even with the stainless steels which satisfied our composition range, (Steel Nos. 3 to 6, and 9), if they are not treated by surface roughness adjustment, they show high contact resistance so that they give unsatisfactory power generation characteristics in the initial period.

EXAMPLE 2

From the hot-rolled steel sheet of steel No. 5, (4 mm in thickness), used in Example 1, eight pieces of specimen (200 mm×200 mm) were prepared by cutting. Each of the specimens was formed to a separator by having 17 rows of grooves (2 mm in width and 1 mm in depth) cut on one side thereof at 2 mm of spacing. After mirror-polishing the surface of the separators (on the side contacting with the carbon paper), some of the separators were immersed in an acidic aqueous solution to adjust the surface roughness. The adjustment of surface roughness was conducted by immersing the specimens in the respective acidic aqueous solutions containing nitric acid and hydrochloric acid or hydrofluoric acid under the condition given below.

Acid treatment A: 10% nitric acid+30% hydrochloric acid, 55° C. for 300 seconds

Acid treatment B: 10% nitric acid+30% hydrochloric acid, 55° C. for 30 seconds

Acid treatment C: 8% nitric acid+3% hydrofluoric acid, 55° C. for 300 seconds

Then, the surface roughness (S, Ra, Δq) was determined under the similar condition to that of Example 1. Furthermore, power generation test using single cell was conducted under the similar condition to that of Example 1. The result is given in Table 6.

As seen in Table 6, the single cells using the separators adjusting the S value to 0.3 μm or smaller by acid treatment A and acid treatment B, respectively, gave good output voltage both after 10 hours of operation and after 1000 hours of operation. The separator of acid treatment A which gave Δq above 0.05 showed superior power generation performance to the separator of acid treatment B.

To the contrary, the single cells with the separator of non-acid treatment and with the separator of acid treatment C to exceed 0.03 of S value were not satisfactory in the output voltage during the initial period.

EXAMPLE 3

Austenitic stainless steels having the respective compositions shown in Table 7 were smelted by converter and secondary refining (SS-VOD process), which smelts were then casted by continuous casting process to prepare the respective slabs having 200 mm in thickness. Each of the slabs was heated to 1250° C., and was hot-rolled to prepare a hot-rolled stainless steel sheet having 4 mm of thickness, which sheet was then annealed (at temperatures from 850° C. to 1100° C.) and pickled, further treated by repeated cold-rolling, annealing at temperatures ranging from 800° C. to 1050° C., and pickling to a thickness of 0.2 mm. After that, the stainless steel sheet was treated by bright annealing at temperatures ranging from 800° C. to 1000° C. to obtain what is called the BA-finished annealed cold-rolled sheet (0.2 mm of thickness).

Four pieces of specimen (200 mm×200 mm) were cut from each of the sheet-width center part and the longitudinal center part of thus prepared cold-rolled stainless steel sheet. Each specimen was press-worked to form a separator having a specified shape. Some of the separators were immersed in an acidic aqueous solution to adjust the surface roughness. The adjustment of surface roughness was conducted by immersing the specimen in the acidic aqueous solution containing 0 to 10% by mass of nitric acid and 3 to 30% by mass of hydrochloric acid or hydrofluoric acid, at 55° C. for 120 seconds.

The condition to make the mean spacing S of local peaks on the surface of separator to 0.3 μm or smaller differs with the composition of austenitic stainless steel as the base material of the separator. Accordingly, a preliminary experiment was conducted for the respective compositions of the austenitic stainless steel sheet to determine the optimum concentration of the acidic aqueous solution. The separator was immersed in the acidic aqueous solution prepared by mixing nitric acid with hydrochloric acid or hydrofluoric acid corresponding to thus determined optimum concentration, at 55° C. for 120 seconds.

Then, the mean spacing S of local peaks, the root mean square slope of the surface roughness profile Δq, and the arithmetic average surface roughness Ra were determined, using similar method to that of Example 1, as the indexes of surface roughness of the separator. The result is given in Table 8.

With the separators treated by surface roughness adjustment (the separators adjusted the mean spacing S of local peaks) and the separators without adjusting the surface roughness, the power generation characteristics were determined applying similar method to that of Example 1.

As the reference examples, single cells were fabricated. One of which single cells used a separator prepared by gold plating (about 0.1 μm of thickness) on a stainless steel sheet (equivalent to SUS304) formed in similar shape to that of above Steel Nos. 1 to 9. Another single cell used a separator made of graphite sheet (4 mm in thickness) having 17 rows of grooves (2 mm in width and 1 mm in depth) cut on one side of the sheet at 2 mm spacing. For each of thus fabricated cells, the output voltage was determined at 0.4 A/cm$^2$ of current density. The method for determining the output voltage was the same to that for above steel Nos. 1 to 9. The result is shown in Table 8.

As shown in Table 8, the single cells which used the separator made of cold-rolled stainless steel sheets satisfying our composition range (Steel Nos. A2 to A6) were treated by surface roughness adjustment to 0.3 μm or smaller S values. Thus fabricated cells gave the output voltage, for both the one after 10 hours of operation (initial period) and the one after 1000 hours of operation, equivalent to the output voltage of the single cell which used the separator made of gold-plated stainless steel and of the single cell which used the separator made of graphite sheet. To the contrary, the single cells using the separators which were made by the respective cold-rolled steel sheets (Steel Nos. A2 to A6) and which were not treated by surface roughness adjustment showed unsatisfactory power generation characteristics after 10 hours of operation because the S value exceeded 0.3 μm.

On the other hand, the single cells using the separators prepared by cold-rolled stainless steels having compositions outside our range, (Steel Nos. A1, and A7 to A9), treated by the surface roughness adjustment to 0.3 μm or smaller S values gave unsatisfactory power generation characteristics after 1000 hours of operation, though the output voltage after 10 hours of operation was equivalent to that of the single cells using the separator made of gold-plated stainless steel and that of the single cells using the separator made of graphite sheet. The single cells using the separators which were made of cold-rolled stainless steel sheets of Steel Nos. A1, and A7 to A9, and which were not treated by surface roughness adjustment gave unsatisfactory power generation characteristics after 10 hours of operation (initial period) because the S value exceeded 0.3 um.

EXAMPLE 4

The adopted base materials were an industrial purity titanium having 99% of purity, (Base material A, and a titanium alloy containing 0.15% by mass of Pd and balance of Ti and inevitable impurities, (Base material B). Both Base material A and Base material B, (1 mm in thickness, 250 mm in width, and 400 mm in length), were treated by repeated rolling and annealing to obtain the respective cold-rolled and annealed sheets having 0.2 mm of thickness.

After applying #600 polishing to the cold-rolled and annealed sheet, four pieces of specimen (200 mm×200 mm) were cut from each of the sheet-width center part and the longitudinal center part of thus prepared sheet. Each of the four specimens for each base material was press-formed to form a separator having a specified shape. For each base material, some of thus prepared separators were treated by surface roughness adjustment. The adjustment of surface roughness was conducted by immersing the specimen in a mixed acid aqueous solution containing 5% by mass of nitric acid and 30% by mass of hydrochloric acid, at 40° C. for 10 seconds.

Similar to Example 1, the surface roughness before and after the treatment was determined in terms of the mean spacing S of local peaks, the arithmetic average surface roughness Ra, and the root mean square slope of the surface roughness Δq.

The power generation characteristics were evaluated for each of the separator treated by surface roughness adjustment and of the separator without surface roughness adjustment.

For the reference examples, the power generation characteristics of single cell was evaluated under similar condition to that above using a separator made of stainless steel SUS304, which was formed into the same shape as above and was plated by gold to about 0.1 μm of thickness on the surface thereof, and a separator made of carbon sheet (3 mm in thickness) having 17 rows of grooves (2 mm in width and 0.5 mm in depth) cut on one side of the carbon sheet at 2 mm spacing.

The power generation characteristics test result is given in Table 9.

As seen in Table 9, the separators formed by Titanium A and Titanium alloy B, both of which satisfied our composition range, being adjusted the surface roughness using a nitric acid and hydrochloric acid aqueous solution to 0.3 μm or less of mean spacing of local peaks assured the output voltage, after 10 hours of operation (initial period) and after 1000 hours of operation, equivalent to that of the carbon separator and the gold-plated stainless steel separator.

To the contrary, the mean spacing S of local peaks on Titanium A and Titanium B, which were not adjusted the surface roughness, became outside our range, and failed to attain satisfactory power generation characteristics at both initial period and after 1000 hours of operation.

INDUSTRIAL APPLICABILITY

We provide a metallic material for conductive member, having low contact resistance equivalent to that of conventional separators made of graphite or gold-plated stainless steel, and having excellent corrosion resistance, and also provides a metallic material for the separator in a proton-exchange membrane fuel cell. As a result, we provide a separator made of inexpensive stainless steel and a separator made of relatively inexpensive titanium to the proton-exchange membrane fuel cell which conventionally adopted an expensive separator made of graphite and an expensive separator made of gold-plated stainless steel.

Furthermore, our steels are also applicable to the cases that only the surface of the separator is made by stainless steel, titanium, or titanium alloy using plating, cladding, vapor deposition, and the like.

Our steels are applicable to not only the separator in a proton-exchange membrane fuel cell but also various metallic conductive parts having electric conductivity.

TABLE 1

| | | Immersion in acidic aqueous solution | Surface roughness | | | Contact resistance (mΩ/cm²) |
|---|---|---|---|---|---|---|
| | | | Contact stylus type | | SEM | |
| | Polishing | | Ra (μm) | Δq | S (μm) | |
| Ferritic stainless steel sheet | #180 | Not treated | 0.42 | 0.142 | 0.45 | 80.1 |
| | | A | 0.41 | 0.150 | 0.42 | 71.9 |
| | | B1 | 0.43 | 0.153 | 0.28 | 8.5 |
| | #400 | Not treated | 0.21 | 0.105 | 0.48 | 92.9 |
| | | A | 0.20 | 0.112 | 0.44 | 79.6 |
| | | B1 | 0.21 | 0.124 | 0.21 | 5.1 |
| | #600 | Not treated | 0.16 | 0.099 | 0.46 | 105.2 |
| | | A | 0.15 | 0.101 | 0.36 | 58.4 |
| | | B1 | 0.15 | 0.108 | 0.26 | 7.2 |
| | | B4 | 0.19 | 0.131 | 0.43 | 55.8 |
| | Mirror polish | Not treated | 0.03 | 0.041 | 0.51 | 285.0 |
| | | A | 0.03 | 0.042 | 0.49 | 254.0 |
| | | B1 | 0.09 | 0.045 | 0.26 | 16.8 |
| | Gold-plated SUS304 | | | | | 2.1 |
| | Graphite | | | | | 3.0 |

TABLE 2

| | | Immersion in acidic aqueous solution | Surface roughness | | | Contact resistance (mΩ/cm²) |
|---|---|---|---|---|---|---|
| | | | Contact stylus type | | SEM | |
| | Polishing | | Ra (μm) | Δq | S (μm) | |
| Austenitic stainless steel sheet | #180 | Not treated | 0.44 | 0.144 | 0.46 | 150.3 |
| | | A | 0.43 | 0.146 | 0.43 | 85.6 |
| | | B2 | 0.39 | 0.155 | 0.29 | 9.5 |
| | #400 | Not treated | 0.22 | 0.112 | 0.45 | 144.2 |
| | | A | 0.21 | 0.120 | 0.42 | 93.3 |
| | | B2 | 0.21 | 0.120 | 0.25 | 7.6 |
| | #600 | Not treated | 0.17 | 0.103 | 0.44 | 161.4 |
| | | A | 0.16 | 0.109 | 0.38 | 77.6 |
| | | B2 | 0.15 | 0.111 | 0.27 | 8.5 |
| | Gold-plated SUS304 | | | | | 2.1 |
| | Graphite | | | | | 3.0 |

TABLE 3

| | | Surface roughness | | | Contact resistance | | |
| | | Contact stylus type | | SEM | Immediately after | After 30 days from the | After 100 days from the |
| | Surface roughness Polishing | adjustment | Ra (μm) | Δq | S (μm) | treatment | treatment | treatment |
|---|---|---|---|---|---|---|---|---|
| Titanium | #180 | Not treated | 0.45 | 0.139 | 0.46 | 72.6 | 168.3 | 170.6 |
| | | A | 0.43 | 0.142 | 0.44 | 48.1 | 95.8 | 96.2 |
| | | B3 | 0.48 | 0.182 | 0.27 | 9.0 | 16.9 | 17.2 |
| | #400 | Not treated | 0.22 | 0.110 | 0.46 | 81.1 | 152.1 | 156.6 |
| | | A | 0.24 | 0.118 | 0.41 | 42.9 | 80.6 | 83.4 |
| | | B3 | 0.41 | 0.178 | 0.20 | 5.5 | 9.6 | 9.8 |
| | #600 | Not treated | 0.16 | 0.102 | 0.37 | 32.9 | 69.1 | 69.8 |
| | | A | 0.16 | 0.103 | 0.35 | 25.1 | 50.8 | 52.7 |
| | | B3 | 0.38 | 0.169 | 0.25 | 7.3 | 15.5 | 15.6 |
| | | Gold-plated SUS304 | | | | 2.1 | — | — |
| | | Graphite | | | | 3.0 | — | — |

TABLE 4

| Steel No. | Chemical composition (wt %) | | | | | | | | | | | | Remark |
| | C | N | Si | Mn | P | S | Cr | Mo | Cu | Nb | Ti | C + N | |
|---|---|---|---|---|---|---|---|---|---|---|---|---|---|
| 1 | 0.0080 | 0.0088 | 0.21 | 0.31 | 0.024 | 0.006 | 15.2 | 1.75 | — | — | 0.10 | 0.0168 | Comparative Example |
| 2 | 0.0029 | 0.0022 | 0.22 | 0.21 | 0.019 | 0.006 | 30.2 | 0.03 | — | 0.24 | — | 0.0051 | Comparative Example |
| 3 | 0.0034 | 0.0035 | 0.20 | 0.17 | 0.020 | 0.003 | 22.3 | 0.40 | — | 0.31 | — | 0.0069 | Example |
| 4 | 0.0075 | 0.0062 | 0.10 | 0.25 | 0.022 | 0.008 | 23.1 | 2.14 | — | 0.32 | — | 0.0137 | Example |
| 5 | 0.0042 | 0.0031 | 0.25 | 0.22 | 0.019 | 0.004 | 22.9 | 3.05 | — | — | — | 0.0073 | Example |
| 6 | 0.0051 | 0.0075 | 0.55 | 0.21 | 0.025 | 0.006 | 31.5 | 1.85 | — | 0.25 | — | 0.0126 | Example |
| 7 | 0.0420 | 0.0200 | 0.15 | 0.21 | 0.027 | 0.004 | 29.5 | 2.00 | — | — | 0.21 | 0.0620 | Comparative Example |
| 8 | 0.0210 | 0.0250 | 0.21 | 0.25 | 0.028 | 0.003 | 29.1 | 2.15 | — | — | 0.22 | 0.0460 | Comparative Example |
| 9 | 0.0083 | 0.0051 | 0.18 | 0.20 | 0.026 | 0.006 | 29.5 | 1.96 | — | 0.11 | 0.12 | 0.0134 | Example |
| 10 | 0.0046 | 0.0062 | 0.18 | 0.24 | 0.270 | 0.006 | 27.9 | 1.55 | 0.44 | 0.29 | — | 0.0108 | Example |

TABLE 5

| Steel | Surface roughness adjustment* | Contact stylus type | | Mean spacing of local peaks | Output voltage (V) | | Remark |
| | | Ra (μm) | Δq | S (μm) | Initial period | After 1000 hours of operation | |
|---|---|---|---|---|---|---|---|
| 1 | Not treated | 0.09 | 0.074 | 0.37 | 0.58 | — | Comparative Example |
| | Treated | 0.14 | 0.082 | 0.29 | 0.65 | 0.24 | Comparative Example |
| 2 | Not treated | 0.08 | 0.068 | 0.58 | 0.42 | — | Comparative Example |
| | Treated | 0.13 | 0.083 | 0.20 | 0.67 | 0.53 | Comparative Example |
| 3 | Not treated | 0.07 | 0.066 | 0.41 | 0.44 | — | Comparative Example |
| | Treated | 0.13 | 0.079 | 0.26 | 0.67 | 0.65 | Example |
| 4 | Not treated | 0.10 | 0.077 | 0.44 | 0.43 | — | Comparative Example |
| | Treated | 0.14 | 0.110 | 0.23 | 0.67 | 0.65 | Example |
| 5 | Not treated | 0.09 | 0.069 | 0.50 | 0.39 | — | Comparative Example |
| | Treated | 0.13 | 0.098 | 0.23 | 0.67 | 0.66 | Example |
| 6 | Not treated | 0.08 | 0.071 | 0.43 | 0.48 | — | Comparative Example |
| | Treated | 0.12 | 0.096 | 0.19 | 0.68 | 0.67 | Example |
| 7 | Not treated | 0.08 | 0.066 | 0.49 | 0.45 | — | Comparative Example |
| | Treated | 0.14 | 0.085 | 0.20 | 0.68 | 0.50 | Comparative Example |

TABLE 5-continued

| Steel | Surface roughness adjustment* | Contact stylus type Ra (μm) | Δq | Mean spacing of local peaks S (μm) | Output voltage (V) Initial period | After 1000 hours of operation | Remark |
|---|---|---|---|---|---|---|---|
| 8 | Not treated | 0.07 | 0.065 | 0.42 | 0.49 | — | Comparative Example |
|   | Treated | 0.14 | 0.088 | 0.24 | 0.67 | 0.48 | Comparative Example |
| 9 | Not treated | 0.09 | 0.070 | 0.46 | 0.50 | — | Comparative Example |
|   | Treated | 0.15 | 0.084 | 0.21 | 0.68 | 0.67 | Example |
| 10 | Not treated | 0.11 | 0.071 | 0.52 | 0.50 | — | Comparative Example |
|   | Treated | 0.16 | 0.087 | 0.25 | 0.67 | 0.66 | Example |
|   | Gold-plated SUS | | | | 0.70 | 0.68 | — |
|   | Graphite | | | | 0.69 | 0.68 | — |

TABLE 6

| Surface roughness adjustment* | Contact stylus type Ra (μm) | Δq | Mean spacing of local peaks S (μm) | Output voltage (V) Initial period | After 1000 hours of operation | Remark |
|---|---|---|---|---|---|---|
| Not treated | 0.03 | 0.043 | 0.42 | 0.42 | — | Comparative Example |
| A | 0.14 | 0.058 | 0.26 | 0.68 | 0.66 | Example |
| B | 0.09 | 0.048 | 0.27 | 0.65 | 0.63 | Example |
| C | 0.13 | 0.055 | 0.36 | 0.58 | — | Comparative Example |

TABLE 9

| Base material | Surface roughness adjustment* | Contact stylus type Ra (μm) | Δq | Mean spacing of local peaks S (μm) | Output voltage (V) Initial period | After 1000 hours of operation | Remark |
|---|---|---|---|---|---|---|---|
| A | Not treated | 0.15 | 0.110 | 0.42 | 0.51 | — | Comparative Example |
|   | Treated | 0.38 | 0.165 | 0.27 | 0.68 | 0.65 | Example |
| B | Not treated | 0.16 | 0.105 | 0.39 | 0.59 | 0.35 | Comparative Example |
|   | Treated | 0.36 | 0.154 | 0.23 | 0.69 | 0.67 | Example |
|   | Gold-plated SUS | | | | 0.70 | 0.68 | — |
|   | Graphite | | | | 0.69 | 0.68 | — |

TABLE 7

| Steel No. | Chemical composition (wt %) | | | | | | | | | | Remark |
|---|---|---|---|---|---|---|---|---|---|---|---|
|  | C | N | Si | Mn | P | S | Ni | Cr | Mo | Cu |  |
| A1 | 0.012 | 0.03 | 0.71 | 1.10 | 0.023 | 0.003 | 8.5 | 17.9 | — | — | Comparative Example |
| A2 | 0.019 | 0.02 | 0.88 | 1.36 | 0.013 | 0.001 | 12.5 | 17.4 | 2.15 | — | Example |
| A3 | 0.021 | 0.01 | 0.61 | 0.38 | 0.031 | 0.002 | 13.3 | 18.5 | 1.41 | 2.13 | Example |
| A4 | 0.015 | 0.03 | 0.55 | 0.60 | 0.020 | 0.003 | 13.2 | 19.2 | 3.85 | — | Example |
| A5 | 0.008 | 0.23 | 0.15 | 0.22 | 0.020 | 0.003 | 25.6 | 22.8 | 5.74 | 0.45 | Example |
| A6 | 0.007 | 0.33 | 0.12 | 0.10 | 0.019 | 0.002 | 37.1 | 25.5 | 7.89 | — | Example |
| A7 | 0.030 | 0.02 | 0.45 | 2.18 | 0.025 | 0.004 | 11.2 | 15.6 | — | — | Comparative Example |
| A8 | 0.039 | 0.05 | 1.15 | 1.18 | 0.027 | 0.004 | 8.7 | 18.4 | — | — | Comparative Example |
| A9 | 0.033 | 0.07 | 0.75 | 0.57 | 0.028 | 0.005 | 12.9 | 17.3 | 2.05 | — | Comparative Example |

TABLE 8

| Steel | Surface roughness adjustment* | Contact stylus type Ra (μm) | Contact stylus type Δq | Mean spacing of local peaks S (μm) | Output voltage (V) Initial period | Output voltage (V) After 1000 hours of operation | Remark |
|---|---|---|---|---|---|---|---|
| A1 | Not treated | 0.07 | 0.068 | 0.40 | 0.59 | — | Comparative Example |
|  | Treated | 0.11 | 0.078 | 0.27 | 0.66 | 0.49 | Comparative Example |
| A2 | Not treated | 0.09 | 0.071 | 0.42 | 0.49 | — | Comparative Example |
|  | Treated | 0.14 | 0.085 | 0.25 | 0.67 | 0.66 | Example |
| A3 | Not treated | 0.07 | 0.071 | 0.50 | 0.38 | — | Comparative Example |
|  | Treated | 0.13 | 0.084 | 0.28 | 0.67 | 0.65 | Example |
| A4 | Not treated | 0.08 | 0.069 | 0.44 | 0.43 | — | Comparative Example |
|  | Treated | 0.13 | 0.081 | 0.22 | 0.67 | 0.66 | Example |
| A5 | Not treated | 0.08 | 0.073 | 0.38 | 0.57 | — | Comparative Example |
|  | Treated | 0.14 | 0.103 | 0.23 | 0.67 | 0.66 | Example |
| A6 | Not treated | 0.09 | 0.072 | 0.41 | 0.51 | — | Comparative Example |
|  | Treated | 0.14 | 0.098 | 0.19 | 0.68 | 0.67 | Example |
| A7 | Not treated | 0.07 | 0.063 | 0.35 | 0.56 | — | Comparative Example |
|  | Treated | 0.12 | 0.079 | 0.29 | 0.65 | 0.42 | Comparative Example |
| A8 | Not treated | 0.09 | 0.076 | 0.43 | 0.44 | — | Comparative Example |
|  | Treated | 0.15 | 0.097 | 0.25 | 0.66 | 0.41 | Comparative Example |
| A9 | Not treated | 0.08 | 0.069 | 0.42 | 0.57 | — | Comparative Example |
|  | Treated | 0.13 | 0.088 | 0.27 | 0.65 | 0.48 | Comparative Example |
|  | Gold-plated SUS |  |  |  | 0.70 | 0.68 | — |
|  | Graphite |  |  |  | 0.69 | 0.68 | — |

The invention claimed is:

1. A metallic material for a conductive member, having a property to easily form a passive film thereon, and having 0.3 μm or less of mean spacing of local peaks between adjacent minimal points of the surface roughness profile wherein the metallic material is a separator and wherein the separator is incorporated in a fuel cell.

2. The metallic material according to claim 1, wherein the metallic material has 0.05 or more of root mean square slope of the surface roughness profile.

3. The metallic material according to claim 1 or claim 2, wherein the metallic material is a ferritic stainless steel comprising 16 to 45% Cr, 0.03% or less C, 0.03% or less N, 0.03% or less (C+N), 0.1 to 5.0% Mo, by mass, and balance of Fe and inevitable impurities.

4. The metallic material according to claim 3, wherein the ferritic stainless steel further comprises at least one element selected from the group consisting of (1) to (4),
    (1) 1.0% or less Si;
    (2) 1.0% or less Mn;
    (3) 3.0% or less Cu; and
    (4) 0.01 to 0.5% of sum of at least one of Ti, Nb, V, and Zr, by mass.

5. A separator for a proton-exchange membrane fuel cell, using the metallic material according to claim 1 or claim 2.

6. A proton-exchange membrane fuel cell comprising a proton-exchange membrane, an electrode, a gas diffusing layer, and a separator according to claim 5.

7. A stainless steel for a separator in a proton-exchange membrane fuel cell, comprising 0.03% or less C, 0.03% or less N, 16 to 45% Cr, 0.1 to 5.0% Mo, 0.03% or less (C+N), by mass, and balance of Fe and inevitable impurities, and having 0.3 μm or less of mean spacing of local peaks between adjacent minimal points of the surface roughness profile wherein the separator is incorporated in a fuel cell.

8. The stainless steel according to claim 7, further comprising at least one element selected from the group consisting of (1) to (4),
    (1) 1.0% or less Si;
    (2) 1.0% or less Mn;
    (3) 3.0% or less Cu; and
    (4) 0.01 to 0.5% of sum of at least one of Ti, Nb, V, and Zr, by mass.

9. A separator for a proton-exchange membrane fuel cell, being made of stainless steel comprising 0.03% or less C, 0.03% or less N, 16 to 45% Cr, 0.1 to 5.0% Mo, 0.03% or less (C+N), by mass, and balance of Fe and inevitable impurities, and having 0.3 μm or less of mean spacing of local peaks between adjacent minimal points of the surface roughness profile wherein the separator is incorporated in a fuel cell.

10. The separator according to claim 9, wherein the stainless steel further comprises at least one element selected from the group consisting of (1) to (4),
    (1) 1.0% or less Si;
    (2) 1.0% or less Mn;
    (3) 3.0% or less Cu; and
    (4) 0.01 to 0.5% of sum of at least one of Ti, Nb, V, and Zr, by mass.

11. A proton-exchange membrane fuel cell comprising a proton-exchange membrane, an electrode, and a separator according to claim 9 or claim 10.

12. The metallic material according to claim 1, having a contact resistance of 5.1 to 16.9 mΩ·cm$^2$.

* * * * *

UNITED STATES PATENT AND TRADEMARK OFFICE
CERTIFICATE OF CORRECTION

| | |
|---|---|
| PATENT NO. | : 8,278,009 B2 |
| APPLICATION NO. | : 10/592857 |
| DATED | : October 2, 2012 |
| INVENTOR(S) | : Ishikawa et al. |

Page 1 of 1

It is certified that error appears in the above-identified patent and that said Letters Patent is hereby corrected as shown below:

<u>In Column 26</u>

At Table 2, at the subheading "Contact resistance" in row 6, please change "7.6" to -- 7.8 --.

Signed and Sealed this
Nineteenth Day of March, 2013

Teresa Stanek Rea
*Acting Director of the United States Patent and Trademark Office*